(12) United States Patent
Saito et al.

(10) Patent No.: US 11,908,055 B2
(45) Date of Patent: Feb. 20, 2024

(54) INFORMATION PROCESSING DEVICE, INFORMATION PROCESSING METHOD, AND RECORDING MEDIUM

(71) Applicant: SONY GROUP CORPORATION, Tokyo (JP)

(72) Inventors: Mari Saito, Tokyo (JP); Kenji Sugihara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 333 days.

(21) Appl. No.: 17/434,970

(22) PCT Filed: Mar. 4, 2020

(86) PCT No.: PCT/JP2020/009041
§ 371 (c)(1),
(2) Date: Aug. 30, 2021

(87) PCT Pub. No.: WO2020/184317
PCT Pub. Date: Sep. 17, 2020

(65) Prior Publication Data
US 2022/0180583 A1 Jun. 9, 2022

(30) Foreign Application Priority Data
Mar. 13, 2019 (JP) .................................. 2019-045552

(51) Int. Cl.
*G06F 3/16* (2006.01)
*G06T 13/00* (2011.01)
(Continued)

(52) U.S. Cl.
CPC .............. *G06T 13/00* (2013.01); *G06F 3/013* (2013.01); *G06F 3/16* (2013.01); *G06T 7/70* (2017.01);
(Continued)

(58) Field of Classification Search
CPC ........... G06T 13/00; G06T 2207/30196; G06F 3/013; G06F 3/16; G06F 7/70; G10L 15/22; G10L 25/51; G10L 2015/2232
See application file for complete search history.

(56) References Cited

U.S. PATENT DOCUMENTS

2016/0313973 A1* 10/2016 Yajima .................... G06F 3/165
2017/0359467 A1* 12/2017 Norris ................... G10L 21/028
(Continued)

FOREIGN PATENT DOCUMENTS

JP 2014-203194 A 10/2014
JP 2017-156511 A 9/2017
(Continued)

OTHER PUBLICATIONS

International Search Report and Written Opinion of PCT Application No. PCT/JP2020/009041, dated May 19, 2020, 08 pages of ISRWO.

*Primary Examiner* — Sanghyuk Park
(74) *Attorney, Agent, or Firm* — CHIP LAW GROUP

(57) ABSTRACT

An information processing device includes an acquisition unit that acquires position information, visual line detection information, and voice information of a first user, and position information of a second user, a determination unit that determines a positional relationship between the first user and the second user on a basis of the position information of the first user and the position information of the second user, a specification unit that specifies a voice dialogue area in which a voice dialogue is possible to be performed between the first user and the second user on a basis of the determined positional relationship, and an avatar control unit that sets a position of an avatar outside the specified voice dialogue area, in which in a case where the voice information of the first user is acquired when the first user is looking outside the voice dialogue area, the avatar (Continued)

control unit causes the avatar to execute a predetermined action, and in a case where the voice information of the first user is acquired when the first user is looking inside the voice dialogue area, the avatar control unit suppresses the avatar from executing the predetermined action.

20 Claims, 27 Drawing Sheets

(51) Int. Cl.
| | | |
|---|---|---|
| *G06T 7/70* | (2017.01) | |
| *G06F 3/01* | (2006.01) | |
| *G10L 15/22* | (2006.01) | |
| *G10L 25/51* | (2013.01) | |

(52) U.S. Cl.
CPC .............. *G10L 15/22* (2013.01); *G10L 25/51* (2013.01); *G06T 2207/30196* (2013.01); *G10L 2015/223* (2013.01)

(56) References Cited

U.S. PATENT DOCUMENTS

2018/0093186 A1    4/2018  Black et al.
2018/0307303 A1*  10/2018  Powderly ............. G02B 27/017

FOREIGN PATENT DOCUMENTS

| JP | 2019-537087 A | 12/2019 |
|---|---|---|
| WO | 2018/064081 A1 | 4/2018 |

\* cited by examiner

FIG.1
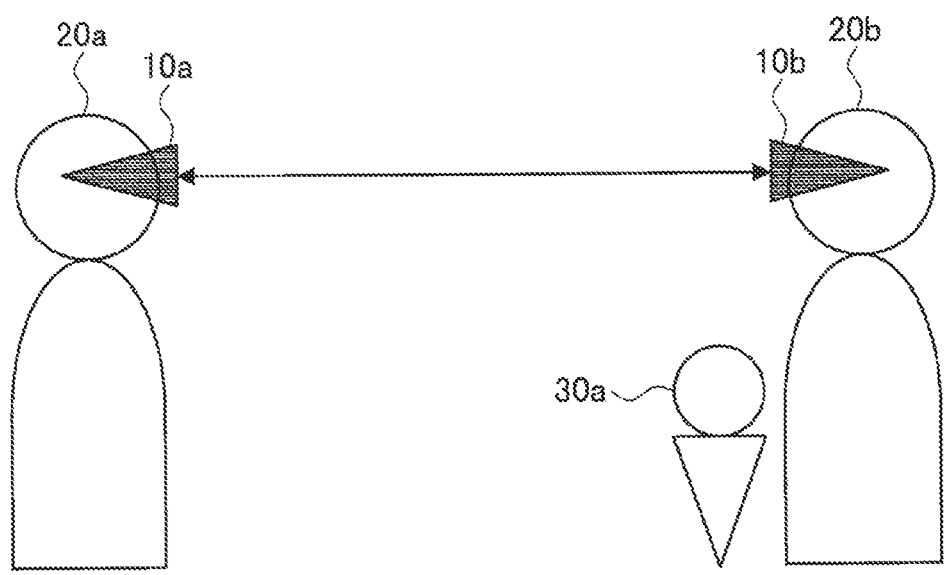
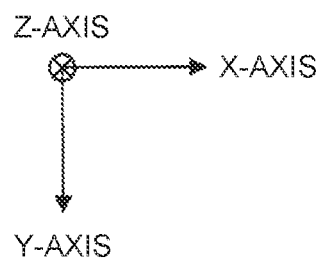

FIG.5
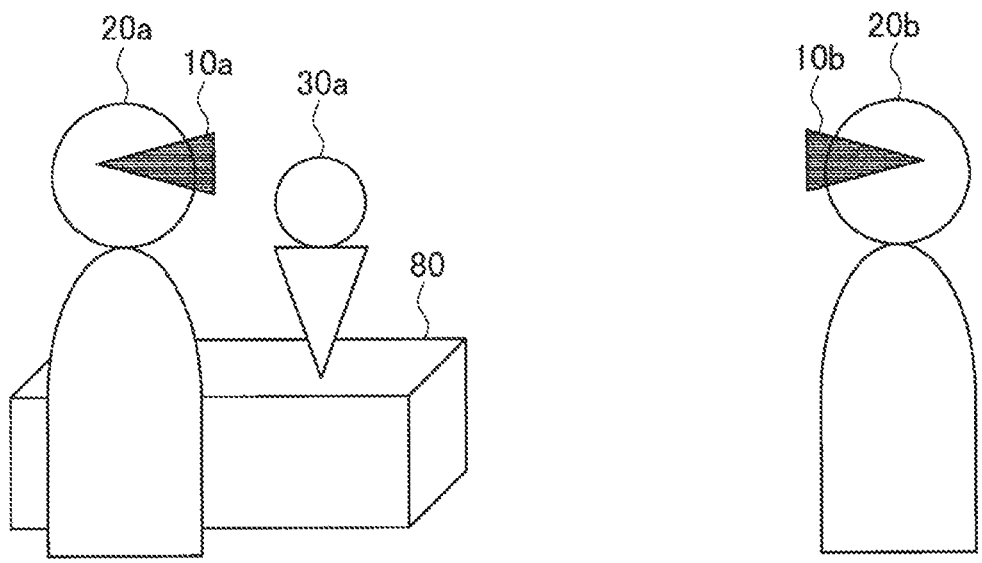
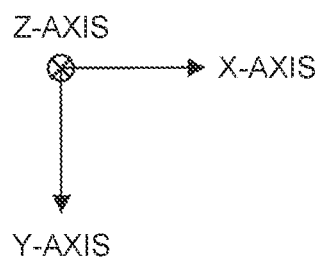

INFORMATION PROCESSING DEVICE, INFORMATION PROCESSING METHOD, AND RECORDING MEDIUM

CROSS REFERENCE TO RELATED APPLICATIONS

This application is a U.S. National Phase of International Patent Application No. PCT/JP2020/009041 filed on Mar. 4, 2020, which claims priority benefit of Japanese Patent Application No. JP 2019-045552 filed in the Japan Patent Office on Mar. 13, 2019. Each of the above-referenced applications is hereby incorporated herein by reference in its entirety.

FIELD

The present disclosure relates to an information processing device, an information processing method, and a recording medium.

BACKGROUND

In recent years, a technology called augmented reality (AR) that superimposes additional information in a real space and presents the superimposed information to a user has attracted attention. By using the AR technology, virtual content (hereinafter also referred to as a "virtual object") in various forms such as a text, an icon, or animation can be superimposed on an object (hereinafter also referred to as a "real object") in the real space and presented to the user.

Further, an agent technology for assisting user behavior has also been rapidly developed. An agent is software having a function of recognizing an instruction from the user and causing an application, a terminal device on which the agent is mounted, a server on a cloud, or the like to execute processing according to the instruction from the user. The agent typically has a voice recognition function. Thus, the user can receive a desired output, for example, by uttering an instruction to the agent. By combining the AR technology and the agent technology, it is also possible to present a virtual object (hereinafter also referred to as an avatar) indicating the agent in the visual field of the user.

In relation to voice recognition by the agent, for example, Patent Literature 1 below discloses a technology in which a robot correctly executes a command of a user by analyzing collected voice of the user on the basis of context information and correctly interpreting the meaning of the voice of the user.

CITATION LIST

Patent Literature

Patent Literature 1: JP 2017-156511 A

SUMMARY

Technical Problem

However, in the voice recognition technology of Cited Literature 1 described above, it is not considered to determine whether or not a command of the user included in a collected speech of the user is a command for the robot. Thus, the robot can erroneously recognize a command from a voice other than the command for the robot, for example, a conversation content between the users, and perform an erroneous operation. Such a malfunction may occur similarly in the avatar.

Accordingly, the present disclosure proposes a new and improved information processing device, information processing method, and recording medium capable of suppressing a malfunction of an avatar.

Solution to Problem

According to the present disclosure, an information processing device is provided that includes: an acquisition unit that acquires position information, visual line detection information, and voice information of a first user, and position information of a second user; a determination unit that determines a positional relationship between the first user and the second user on a basis of the position information of the first user and the position information of the second user; a specification unit that specifies a voice dialogue area in which a voice dialogue is possible to be performed between the first user and the second user on a basis of the determined positional relationship; and an avatar control unit that sets a position of an avatar outside the specified voice dialogue area, wherein in a case where the voice information of the first user is acquired when the first user is looking outside the voice dialogue area, the avatar control unit causes the avatar to execute a predetermined action, and in a case where the voice information of the first user is acquired when the first user is looking inside the voice dialogue area, the avatar control unit suppresses the avatar from executing the predetermined action.

Moreover, according to the present disclosure, an information processing method is provided that includes: acquiring position information, visual line detection information, and voice information of a first user, and position information of a second user; determining a positional relationship between the first user and the second user on a basis of the position information of the first user and the position information of the second user; and specifying a voice dialogue area in which a voice dialogue is possible to be performed between the first user and the second user on a basis of the determined positional relationship; and setting a position of an avatar outside the specified voice dialogue area, wherein in a case where the voice information of the first user is acquired when the first user is looking outside the voice dialogue area, the setting causes the avatar to execute a predetermined action, and in a case where the voice information of the first user is acquired when the first user is looking inside the voice dialogue area, the setting suppresses the avatar from executing the predetermined action.

Moreover, according to the present disclosure, a recording medium recording a program is provided that causes a computer to function as: an acquisition unit that acquires position information, visual line detection information, and voice information of a first user, and position information of a second user; a determination unit that determines a positional relationship between the first user and the second user on a basis of the position information of the first user and the position information of the second user; a specification unit that specifies a voice dialogue area in which a voice dialogue is possible to be performed between the first user and the second user on a basis of the determined positional relationship; and an avatar control unit that sets a position of an avatar outside the specified voice dialogue area, wherein in a case where the voice information of the first user is acquired when the first user is looking outside the voice dialogue area, the avatar control unit causes the avatar to execute a predetermined action, and in a case where the voice information of the first user is acquired when the first user is looking inside the voice dialogue area, the avatar control unit suppresses the avatar from executing the predetermined action.

BRIEF DESCRIPTION OF DRAWINGS

FIG. 1 is a diagram illustrating an outline of an information processing system according to a first embodiment of the present disclosure.

FIG. 5 is a diagram illustrating an example of a display position of an avatar according to the same embodiment.

DESCRIPTION OF EMBODIMENTS

Figure 2:
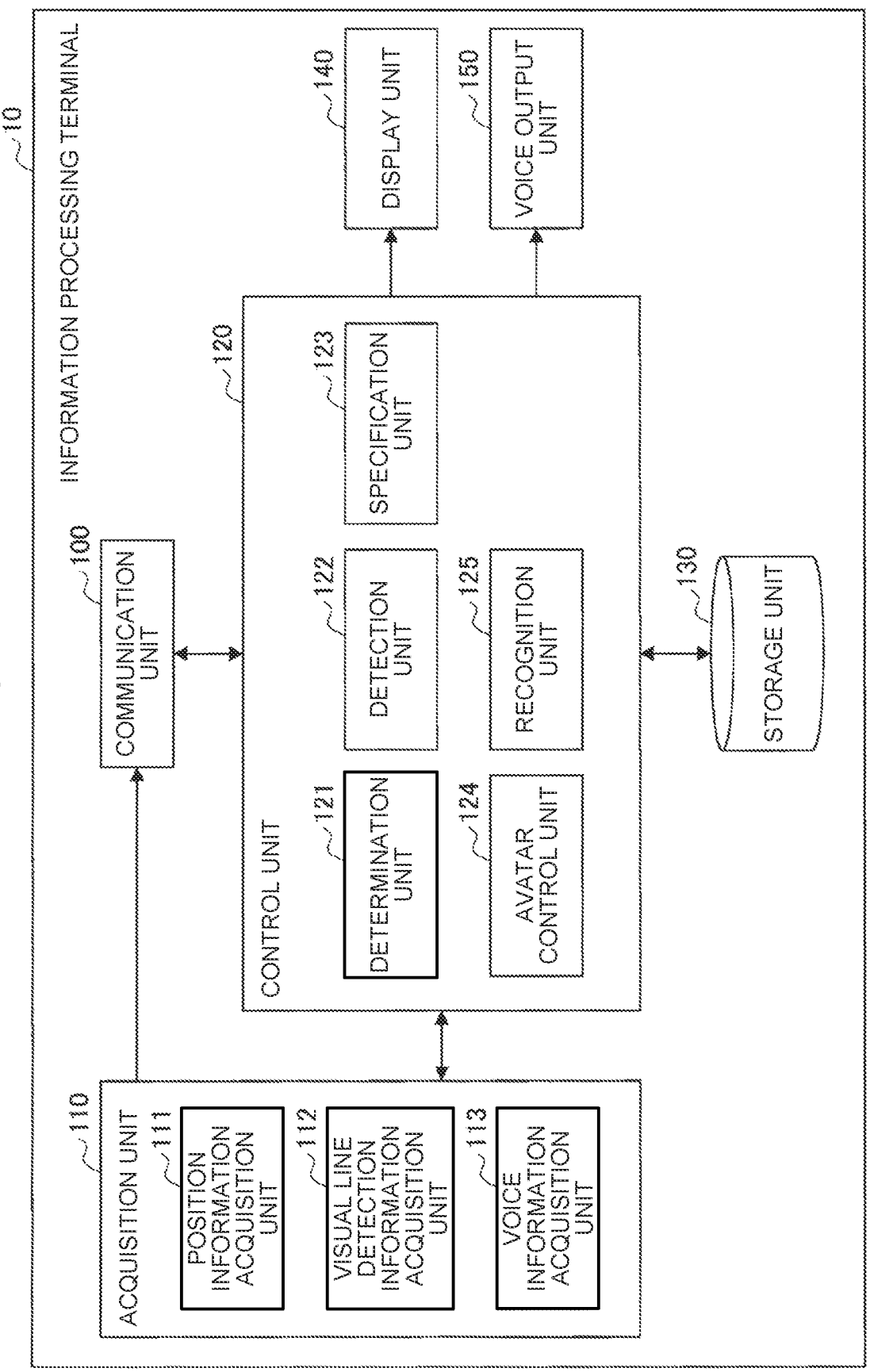
FIG. 2 is a block diagram illustrating a configuration example of an information processing terminal according to the same embodiment.

Hereinafter, preferred embodiments of the present disclosure will be described in detail with reference to the accompanying drawings. Note that, in the present description and the drawings, components having substantially the same functional configuration are denoted by the same reference numerals, and redundant description is omitted.

Further, in the present description and the drawings, a plurality of components having substantially the same functional configuration may be distinguished by attaching different alphabets after the same reference numeral. For example, a plurality of components having substantially the same functional configuration is distinguished similarly to an information processing terminal 10*a* and an information processing terminal 10*b* as necessary. However, in a case where it is not particularly necessary to distinguish each of a plurality of components having substantially the same functional configuration, only the same reference numeral is attached. For example, in a case where it is not necessary to particularly distinguish the information processing terminal 10*a* and the information processing terminal 10*b*, the information processing terminal 10*a* and the information processing terminal 10*b* are simply referred to as an information processing terminal 10.

Note that the description will be given in the following order.

1. First Embodiment
2. Second Embodiment
3. Hardware configuration example
4. Summary 1. First Embodiment <1-1. Outline of Information Processing System>

First, an outline of an information processing system according to a first embodiment of the present disclosure will be described. FIG. 1 is a diagram illustrating the outline of the information processing system according to the first embodiment of the present disclosure. The information processing system according to the first embodiment presents a virtual object 30 (hereinafter also referred to as an avatar 30) to a user 20 by an information processing terminal 10 having a display unit held in front of the eyes of the user 20 by being worn on the head by the user 20. Hereinafter, a description will be given based on the eye line of the user 20a wearing an information processing terminal 10a on the head. Note that the content described below can also be a description based on the eye line of the user 20b wearing an information processing terminal 10b on the head by replacing the alphabets of the reference numerals from a to b.

For example, as illustrated in FIG. 1, a user 20a (first user) wears the information processing terminal 10a on the head. In a case where the user 20a has an avatar 30a, the avatar 30a illustrated in FIG. 1 is displayed as a virtual object on the display unit of the information processing terminal 10a. The user 20a having the avatar 30a indicates that the target of presenting the avatar 30a is the user 20a. The user 20b (second user) is a dialogue partner of the user 20a, and wears the information processing terminal 10b on the head similarly to that of the user 20a. The information processing terminal 10a and the information processing terminal 10b are configured to be capable of transmitting and receiving information to and from each other.

The information processing terminal 10 according to the first embodiment is an information processing device achieved by, for example, a head mounted display device (HMD) or the like. Examples of the HMD applicable to the information processing terminal 10 include a see-through HMD, a video see-through HMD, and a retinal projection HMD.

The see-through HMD uses, for example, a half mirror or a transparent light guide plate to hold a virtual image optical system including a transparent light guide unit or the like in front of the eyes of the user 20, and displays an image inside the virtual image optical system. Thus, the user 20 wearing the see-through HMD can have the outside scenery in his or her visual field while viewing the image displayed inside the virtual image optical system. With such a configuration, the see-through HMD can also superimpose an image of a virtual object on an optical image of a real object located in a real space according to a recognition result of at least one of the position or the posture of the see-through HMD on the basis of, for example, the AR technology. Note that, as a specific example of the see-through HMD, there is what is called a glasses-type wearable device in which a portion corresponding to a lens of glasses is configured as the virtual image optical system.

In a case where the video see-through HMD is worn on the head or the face of the user 20, the video see-through HMD is worn so as to cover the eyes of the user 20, and a display unit such as a display is held in front of the eyes of the user 20. Further, the video see-through HMD has an imaging unit for capturing an image of a surrounding scenery, and causes the display unit to display an image of the scenery in front of the user 20 captured by the imaging unit. With such a configuration, it is difficult for the user 20 wearing the video see-through HMD to directly have the outside scenery in his or her visual field, but the outside scenery can be recognized by the image displayed on the display unit. Further, at this time, the video see-through HMD may superimpose a virtual object on an image of the outside scenery according to a recognition result of at least one of the position or the posture of the video see-through HMD on the basis of, for example, the AR technology.

In the retinal projection HMD, a projection unit is held in front of the eyes of the user 20, and an image is projected from the projection unit toward the eyes of the user 20 so that the image is superimposed on the outside scenery. More specifically, in the retinal projection HMD, the image is directly projected from the projection unit onto the retina of the eye of the user 20, and the image is formed on the retina. With such a configuration, even in a case of the user 20 who is near-sighted or far-sighted, it is possible to view a clearer image. Further, the user 20 wearing the retinal projection HMD can have the outside scenery in his or her visual field while viewing the image projected from the projection unit. With such a configuration, the retinal projection HMD can also superimpose the image of the virtual object on the optical image of the real object located in the real space according to a recognition result of at least one of the position or the posture of the retinal projection HMD on the basis of, for example, the AR technology.

Further, other than the examples described above, an HMD called an immersive HMD can be exemplified. Similarly to the video see-through HMD, the immersive HMD is worn so as to cover the eyes of the user 20, and a display unit such as a display is held in front of the eyes of the user 20. Therefore, it is difficult for the user 20 wearing the immersive HMD to directly have the outside scenery (that is, the scenery in the real world) in his or her visual field, and only the image displayed on the display unit enters the visual field. With such a configuration, the immersive HMD can give a sense of immersion to the user 20 viewing the image. Therefore, the immersive HMD can be applied to a case where information is presented mainly on the basis of a virtual reality (VR) technology, for example.

(Summary of Problems)

As illustrated in FIG. 1, it is assumed that, when the avatar 30a displayed on the display unit of the information processing terminal 10a is located near the user 20b, the user 20a makes an utterance while directing his or her visual line toward the user 20b. At this time, the information processing terminal 10a can distinguish which of the user 20b and the avatar 30a the user 20a has uttered to, for example, on the basis of the visual line of the user 20a. However, in a case where the avatar 30a is near the user 20b, it is difficult for the information processing terminal 10a to accurately distinguish whether the utterance by the user 20a is for the user 20b or the avatar 30a. In a case where the utterance by the user 20a is for the user 20b but is erroneously distinguished to be an utterance for the avatar 30a, the avatar 30b may perform an inappropriate action on the basis of a voice recognition result for the utterance.

Accordingly, in the information processing system according to an embodiment of the present disclosure, it is possible to display the avatar 30a at a position where it is possible to distinguish whether the utterance by the user 20a is a dialogue with the user 20b or the avatar 30a. Specifically, the information processing terminal 10a specifies an area in which a voice dialogue between the user 20a and the user 20b can be performed, sets the position of the avatar 30a outside the specified area, and displays the avatar 30a at the set position. The area where the voice dialogue between the user 20a and the user 20b can be performed is an area (in other words, a direction) that the visual line or the face of the user 20a faces when the user 20a and the user 20b have the voice dialogue. Thus, the information processing terminal 10a can distinguish that an utterance when the user 20a is looking at the inside of the specified area is an utterance for the user 20b, and an utterance when the user 20a is looking at the outside of the specified area is an utterance for the avatar 30a. Then, because the information processing terminal 10a can control an action to be executed by the avatar 30a according to a result of distinguishing the utterance target of the user 20a, it becomes possible to cause the avatar 30a to execute an appropriate action.

Note that the above-described area in which the voice dialogue between the user 20a and the user 20b can be performed will be referred to as a "voice dialogue area" below. Further, an area that can be set as the position where the information processing terminal 10 displays the avatar 30a will be hereinafter referred to as an "avatar display area".

<1-2. Configuration of Information Processing Terminal>

Next, a configuration of the information processing terminal 10 according to the first embodiment will be described. FIG. 2 is a block diagram illustrating a configuration example of the information processing terminal according to the first embodiment of the present disclosure. As illustrated in FIG. 2, the information processing terminal 10 includes a communication unit 100, an acquisition unit 110, a control unit 120, a storage unit 130, a display unit 140, and a voice output unit 150. Hereinafter, a configuration of the information processing terminal 10a will be described as an example. A configuration of the information processing terminal 10b is similar to the configuration of the information processing terminal 10a. That is, regarding the configuration of the information processing terminal 10b, in the following description, the information processing terminal 10a is only required to be replaced with the information processing terminal 10b, and the user 20a is only required to be replaced with the user 20b.

(1) Communication Unit 100

The communication unit 100 has a function of communicating with an external device. For example, in communication with the external device, the communication unit 100 outputs information received from the external device to the control unit 120. Specifically, the communication unit 100 receives position information of the user 20b from the information processing terminal 10b, and outputs the position information to the control unit 120. Further, the communication unit 100 may receive information indicating the avatar display area for the user 20b from the information processing terminal 10b, and output the information to the control unit 120.

Further, the communication unit 100 transmits information input from the control unit 120 to the external device in communication with the external device. As a specific example, in a case of the communication unit 100 of the information processing terminal 10a, the communication unit 100 transmits position information of the user 20a input from the acquisition unit 110 to the information processing terminal 10b. Further, the communication unit 100 may transmit the information indicating the avatar display area for the user 20a input from the control unit 120 to the information processing terminal 10b.

(2) Acquisition Unit 110

The acquisition unit 110 has a function of acquiring information used for processing in the control unit 120. The acquisition unit 110 can include various sensor devices. For example, the acquisition unit 110 may include a camera, a depth sensor, a microphone (hereinafter also referred to as a mic), an inertial sensor, an electrode, and the like. Note that the acquisition unit 110 may include one or a combination of a plurality of the above-described sensor devices, or may include a plurality of devices of the same type.

The camera is an imaging device that includes a lens system such as an RGB camera, a drive system, and an imaging element and captures an image (a still image or a moving image). With the imaging device, the acquisition unit 110 can image the periphery of the user 20a and the eyes of the user 20a. Specifically, for example, in a case where the information processing terminal 10a is configured as an HMD, the imaging device is provided so as to be capable of imaging the outside of the HMD, and thus the imaging device can image the periphery of the user 20a. Such an imaging device will be hereinafter also referred to as an outward imaging device. Further, since the imaging device is provided toward the eyes of the user 20a, the imaging device can image the eyes of the user 20a. Such an imaging device will be hereinafter also referred to as an inward imaging device.

The mic is a device that collects ambient sound and outputs audio data converted into a digital signal via an amplifier and an analog digital converter (ADC). With the mic, the acquisition unit 110 can acquire voice information of the user 20a and the user 20b. The number of mics is not limited to one, and may be plural or may constitute what is called a mic array. The inertial sensor is a device that detects inertial information such as acceleration and angular velocity. With the inertial sensor, the acquisition unit 110 can acquire inertial information of the user 20a. The electrode is a device that detects an ocular potential. The ocular potential is a potential difference generated between a positive charge carried by the cornea and a negative charge carried by the retina. The ocular potential may change with eye movement or blinking. Thus, eye movement can be detected based on the ocular potential. Further, based on the detected eye movement, a direction in which the eye has moved may also be detected. The electrode is provided, for example, at a position on the information processing terminal 10a corresponding to a position around the eyes of the user 20a, thereby detecting the ocular potential of the user 20a. With the electrodes, the acquisition unit 110 can acquire the ocular potential of the user 20a. The number of electrodes is not limited to one, and may be plural. The depth sensor is a device that acquires depth information, such as an infrared distance measuring device, an ultrasonic distance measuring device, laser imaging detection and ranging (LiDAR), or a stereo camera. The acquisition unit 110 can acquire the position information of the user 20a and the user 20b on the basis of the information acquired by the depth sensor.

The acquisition unit 110 includes a position information acquisition unit 111, a visual line detection information acquisition unit 112, and a voice information acquisition unit 113 that acquire information used for processing in the control unit 120 on the basis of sensing data of the sensor device described above.

(2-1) Position Information Acquisition Unit 111

The position information acquisition unit 111 has a function of acquiring position information of the user 20.

The position information acquisition unit 111 acquires, for example, the position information of the user 20b on the basis of an image recognition result of an image captured by the outward imaging device described above. Specifically, the position information acquisition unit 111 may acquire the position information of the user 20b by combining the position and posture of the outward imaging device detected on the basis of the inertial information and the position of the user 20b in the image captured by the outward imaging device. Note that the position information acquired by such processing is information indicating the direction of the user 20b based on the user 20a. The position information acquisition unit 111 may acquire the position information indicating the three-dimensional position of the user 20b by further combining depth information of the user 20*b* with the information indicating the direction of the user 20*b*.

Further, the position information acquisition unit 111 may acquire the position information of the user 20*b* by applying sound source direction estimation processing to the voice information acquired by the microphone described above. Specifically, the position information acquisition unit 111 acquires the position information of the user 20*b* by combining the position and attitude of the microphone detected on the basis of the inertial information and the direction of the user 20*b* obtained by the sound source direction estimation processing. Note that the position information acquired by such processing is information indicating the direction of the user 20*b* based on the user 20*a*. The position information acquisition unit 111 may acquire the position information indicating the three-dimensional position of the user 20*b* by further combining depth information of the user 20*b* with the information indicating the direction of the user 20*b*.

The position information acquisition unit 111 may further include a global positioning system (GPS) sensor or an inertial navigation system (INS). The position information acquisition unit 111 may acquire the position information of the user 20*a* on the basis of information acquired by the GPS or the INS.

(2-2) Visual Line Detection Information Acquisition Unit 112

The visual line detection information acquisition unit 112 has a function of acquiring visual line detection information that is information for detecting the visual line of the user 20*a*. The visual line detection information is, for example, an image of the eyes of the user 20*a*, inertia information of the user 20*a*, or the ocular potential of the user 20*a*. For example, the visual line detection information acquisition unit 112 acquires the image of the eyes of the user 20*a* as visual line detection information by imaging the eyes of the user 20*a* with the inward imaging device described above. Further, the visual line detection information acquisition unit 112 acquires the inertial information of the user 20*a* as the visual line detection information by the above-described inertial sensor. Further, the visual line detection information acquisition unit 112 acquires the ocular potential of the user 20*a* as the visual line detection information by the electrode described above. The visual line detection information acquisition unit 112 can also acquire, as the visual line detection information, information indicating which area of the image captured by the outward imaging device the visual line of the user 20*a* is directed to, by combining these pieces of information with the image captured by the outward imaging device.

(2-3) Voice Information Acquisition Unit 113

The voice information acquisition unit 113 has a function of acquiring voice information of the user 20*a* or the user 20*b*. The voice information acquisition unit 113 acquires, for example, the voice information of the user 20*a* or the user 20*b* using the above-described microphone.

(3) Control Unit 120

The control unit 120 has a function of controlling the entire operation of the information processing terminal 10. In order to achieve the function, the control unit 120 includes a determination unit 121, a detection unit 122, a specification unit 123, an avatar control unit 124, and a recognition unit 125.

(3-1) Determination Unit 121

The determination unit 121 has a function of determining a positional relationship between the user 20*a* and the user 20*b*. For example, the determination unit 121 determines whether or not the user 20*a* and the user 20*b* are in a positional relationship of performing a dialogue on the basis of the position information of the user 20*a* and the position information of the user 20*b* input from the acquisition unit 110 or from the acquisition unit 110 and the communication unit 100. A result of the determination is used to specify the voice dialogue area in the specification unit 123, and thus the determination unit 121 outputs the determination result to the specification unit 123.

(3-2) Detection Unit 122

The detection unit 122 has a function of detecting information used for processing in the specification unit 123 on the basis of input information. For example, the detection unit 122 detects visual line direction information and visual field information of the user 20*a* on the basis of the visual line detection information acquired by the visual line detection information acquisition unit 112. The visual line direction information includes a gaze point of the user 20*a* or a face direction of the user 20*a*. The gaze point of the user 20*a* detected by the detection unit 122 is used by the specification unit 123 to specify a gaze area, which is an area where gaze points are distributed. The gaze area specified on the basis of the gaze point is further used by the specification unit 123 to specify the voice dialogue area. The face direction of the user 20*a* detected by the detection unit 122 is used by the specification unit 123 to specify the voice dialogue area.

The visual field information includes information indicating a central visual field and a peripheral visual field of the user 20*a*. Generally, a human visual field has about 100 degrees on each of the left and right sides. In the visual field, a range in which the shape and color of an object can be clearly recognized is also referred to as a central visual field, and has about 20 degrees on each of the left and right sides. Further, a range obtained by excluding the range of the central visual field from the human visual field is also referred to as a peripheral visual field. It is difficult for a human to clearly recognize the shape and color of an object in a peripheral visual field. For example, the detection unit 122 detects a range within 20 degrees to the left and right in the visual line direction of the user 20*a* as the central visual field, and detects a range of more than 20 degrees to the left and right and 100 degrees or less as the peripheral visual field. The same applies to the vertical direction.

When detecting the gaze point of the user 20*a* as the visual line direction information, the detection unit 122 can detect the central visual field and the peripheral visual field of the user 20*a* with reference to the position of the gaze point. Therefore, in a case where the gaze point of the user 20*a* is detected on the basis of the visual line detection information, the detection unit 122 further detects the central visual field and the peripheral visual field on the basis of the gaze point, and outputs information indicating the detected central visual field and peripheral visual field to the specification unit 123. Then, the central visual field and the peripheral visual field of the user 20*a* are used by the specification unit 123 to specify the avatar display area.

On the other hand, in a case where the direction of the face of the user 20*a* is detected as the visual line direction information, the detection unit 122 estimates the peripheral visual field of the user 20*a* from the angle of the above-described peripheral visual field of a general human with reference to the direction of the face, and outputs the estimated peripheral visual field to the specification unit 123. Then, the peripheral visual field of the user 20*a* is used to specify the avatar display area by the specification unit 123.

(3-3) Specification Unit 123

The specification unit 123 has a function of specifying various areas on the basis of input information.

In a case where the visual line direction information is the gaze point of the user 20a, the specification unit 123 specifies the gaze area of the user 20a on the basis of the gaze point of the user 20a input from the detection unit 122. Further, the specification unit 123 specifies the voice dialogue area on the basis of the visual line direction information of the user 20a when the user 20a and the user 20b are having a dialogue, which is input from the detection unit 122. The specification unit 123 specifies the avatar display area on the basis of the voice dialogue area, the central visual field, and the peripheral visual field of the user 20a input from the detection unit 122. Specifically, the specification unit 123 specifies a range outside the voice dialogue area and the central visual field and inside the peripheral visual field of the user 20a as the avatar display area of the user 20a.

In a case where the visual line direction information is the direction of the face of the user 20a, the specification unit 123 first specifies the voice dialogue area on the basis of the visual line direction information of the user 20a when the user 20a and the user 20b are having a dialogue, which is input from the detection unit 122. Further, a visual line movement area, which is an area where the visual line of the user 20a can move, is specified on the basis of the direction of the face of the user 20a input from the detection unit 122. Next, the specification unit 123 specifies the avatar display area of the user 20a on the basis of the specified voice dialogue area and visual line movement area, and the peripheral visual field of the user 20a input from the detection unit 122. Specifically, the specification unit 123 specifies a range outside the visual line movement area and inside the peripheral visual field of the user 20a as the avatar display area of the user 20a.

As described above, the specification unit 123 specifies the voice dialogue area on the basis of the visual line direction information of the user 20a when the user 20a and the user 20b are having a dialogue with each other, thereby specifying a space in which it is difficult to distinguish the utterance target of the user 20a by the visual line of the user 20a.

(3-4) Avatar Control Unit 124

The avatar control unit 124 has a function of performing control related to the avatar 30. For example, the avatar control unit 124 sets a position (hereinafter also referred to as the position of the avatar 30) at which the avatar 30 is displayed on the basis of the avatar display area specified by the specification unit 123. The avatar control unit 124 may set the position of the avatar 30 at any position within the avatar display area.

The avatar control unit 124 controls display of the avatar 30 at the set position of the avatar 30. For example, in a case where the avatar 30 can be displayed at the position of the set avatar 30, the avatar control unit 124 causes display of the avatar 30. Further, in a case where the avatar 30 cannot be displayed at the set position of the avatar 30, the avatar control unit 124 resets the position of the avatar 30 and causes display of the avatar 30.

In a case where it is not possible to set the position of the avatar 30 at a position where the avatar 30 can be displayed, the avatar control unit 124 sets the position of the avatar 30 at a position that is not a position where the avatar 30 can be displayed but is in the avatar display area. In this case, the avatar control unit 124 causes information indicating the set position of the avatar 30 to be presented to the user 20a. For example, the avatar control unit 124 causes the set position of the avatar 30 to be presented by displaying an object or outputting a voice. Thus, even if the avatar 30a is not displayed, the user 20a can know the position of the avatar 30 by the displayed object or the output voice.

The avatar control unit 124 controls execution of a predetermined action by the avatar 30a. The predetermined action is an action determined on the basis of a result of voice recognition by the recognition unit 125. For example, in a case where voice information of the user 20a is acquired when the user 20a is looking outside the voice dialogue area, the avatar control unit 124 causes the avatar 30a to execute the predetermined action. For example, the avatar control unit 124 causes the avatar 30a to execute an instruction from the user 20a recognized by voice recognition on the voice information of the user 20a. On the other hand, in a case where the voice information of the user 20a is acquired when the user 20a is looking inside the voice dialogue area, the avatar control unit 124 suppresses the avatar 30a from executing the predetermined action. The suppression is, for example, to prohibit the avatar 30a from reacting to an utterance of the user 20a.

As described above, when the voice information of the user 20a is acquired, the avatar control unit 124 can distinguish whether or not the utterance of the user 20a is for the avatar 30a by whether or not the user 20a is looking inside the voice dialogue area.

The avatar control unit 124 acquires information regarding a position where the avatar 30b can be displayed for the user 20b from an external device via the communication unit 100. The position where the avatar 30b can be displayed is, for example, the avatar display area of the avatar 30b specified by the specification unit 123 of the information processing terminal 10b. The avatar control unit 124 acquires information indicating the avatar display area of the avatar 30b from the information processing terminal 10b via the communication unit 100. Then, the acquired information indicating the avatar display area of the avatar 30b is output to the specification unit 123. The information indicating the avatar display area of the avatar 30b is used, for example, to specify the avatar display area when the user 20a and the user 20b use a common avatar.

(3-5) Recognition Unit 125

The recognition unit 125 has a function of performing voice recognition on the basis of voice information. For example, the recognition unit 125 performs voice recognition on voice information acquired when the user 20a utters to the avatar 30a. Thus, the recognition unit 125 can recognize an instruction or the like to the avatar 30a of the user 20a from the voice information. Then, the recognition unit 125 outputs the result of the voice recognition to the avatar control unit 124.

(4) Storage Unit 130

The storage unit 130 has a function of storing data related to processing in the information processing terminal 10. For example, the storage unit 130 stores the position information, the visual line detection information, and the voice information acquired by the acquisition unit 110. Further, the storage unit 130 may store determined information, detected information, identified information, information used for avatar control, recognized information, and the like in the control unit 120. Further, the storage unit 130 may store information acquired via the communication unit 100. Note that the data stored in the storage unit 130 is not limited to the above example. For example, the storage unit 130 may store programs such as various applications.

(5) Display Unit 140

The display unit 140 has a function of displaying the avatar 30, and displays the avatar 30 at a position set by the avatar control unit 124. Thus, the display unit 140 can display the avatar 30a at a position where it can be distinguished whether an utterance by the user 20a is an utterance to the avatar 30a or the user 20b. Note that the display unit 140 can be achieved by a screen on which the avatar 30 can be displayed. For example, in a case where the information processing terminal 10a is configured as an HMD, the display unit 140 includes left and right screens fixed for the left and right eyes, respectively, of the user 20a, and displays a left-eye image and a right-eye image. The screen of the display unit 140 includes, for example, a display panel such as a liquid crystal display (LCD) or an organic electro luminescence (EL) display, or a laser scanning display such as a retina direct drawing display.

(6) Voice Output Unit 150

The voice output unit 150 has a function of outputting a voice input from the control unit 120. The voice output unit 150 outputs, for example, a voice indicating the display position of the avatar 30 input from the control unit 120. Note that the voice output unit 330 can be achieved by, for example, a speaker. For example, in a case where the information processing terminal 10 is configured as an HMD, the speaker is configured as a headphone worn on the head of the user 20a and reproduces a voice signal. Note that the speaker is not limited to the headphone type, and may be configured as an earphone or a bone conduction speaker.

<1-3. Display Position of Voice Dialogue Area and Avatar>

The configuration of the information processing terminal 10 has been described above. Next, the voice dialogue area and the display position of the avatar will be described. The information processing terminal 10a according to the present embodiment specifies a voice dialogue area 40a and sets the position of the avatar 30a on the basis of the visual line of the user 20a or the direction of the face of the user 20a. Hereinafter, a situation in which the user 20a and the user 20b face each other and have a dialogue in a stationary state will be described as an example.

Figure 3:
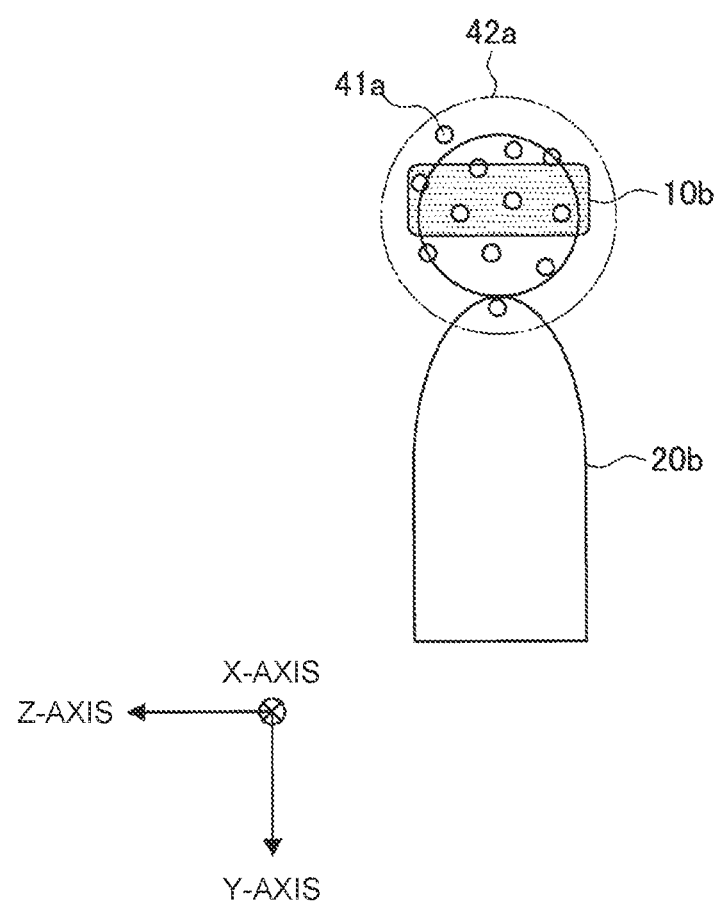
FIG. 3 is a diagram illustrating a detection example of a gaze area according to the same embodiment.
Figure 4:
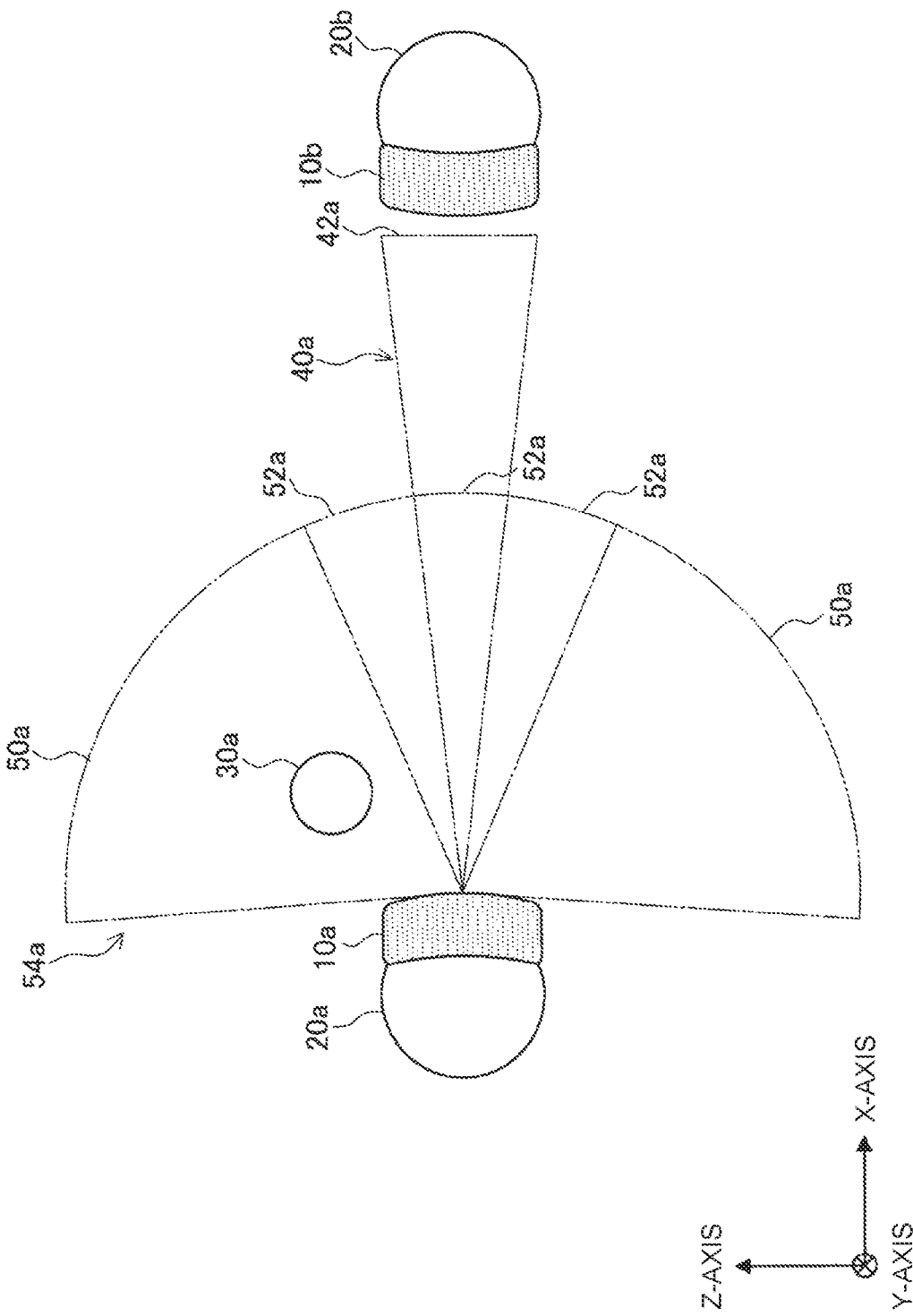
FIG. 4 is a diagram illustrating a voice dialogue area and an avatar display area based on a visual line according to the same embodiment.

(1) Specification of Voice Dialogue Area and Setting of Avatar Position Based on Visual Line First, an example in which the information processing terminal 10a specifies the voice dialogue area 40a and sets the avatar 30a on the basis of the visual line of the user 20a will be described. FIG. 3 is a diagram illustrating a detection example of a gaze area according to the present embodiment. FIG. 4 is a diagram illustrating the voice dialogue area and an avatar display area based on the visual line according to the present embodiment. FIG. 5 is a diagram illustrating an example of a display position of the avatar according to the present embodiment.

(1-1) Detection of Gaze Point

First, the detection unit 122 detects a gaze point 41 of the user 20a as the visual line direction information on the basis of the visual line detection information. For example, as illustrated in FIG. 3, the detection unit 122 detects the gaze point 41 of the user 20a as the visual line direction information on the basis of a captured image obtained by capturing the eyes of the user 20a acquired as the visual line detection information. Note that, in FIG. 3, a reference sign is added to only one of a plurality of gaze points 41 detected by the detection unit 122, and others are omitted. Further, the detection unit 122 may detect the gaze point 41 of the user 20a as the visual line direction information on the basis of the ocular potential of the user 20a acquired as the visual line detection information. For example, the detection unit 122 detects movement of the eyes of the user 20a from the ocular potential of the user 20a, and detects the gaze point 41 of the user 20a from a direction in which the eyes of the user 20a have moved.

The detection unit 122 can detect the gaze point 41 of the user 20a to detect the visual line direction of the user 20a. Further, the detection unit 122 can acquire a distribution of the visual line direction of the user 20a by detecting the plurality of gaze points 41 of the user 20a, and can improve specific accuracy of the visual line direction of the user 20a. Furthermore, the detection unit 122 can further improve the specific accuracy of the visual line direction of the user 20a by using the positional relationship determined by the determination unit 121.

(1-2) Identification of Gaze Area

Next, as illustrated in FIG. 3, the specification unit 123 specifies a gaze area 42 which is an area where gaze points 41 of the user 20a are distributed. Further, the gaze area 42 may be an area specified by the diopter range of the user 20a. Further, the gaze area 42 may be an area where a previously estimated visual line of the user 20a moves. Note that the shape of the gaze area 42 illustrated in FIG. 3 is circular, but the shape of the gaze area 42 is not particularly limited.

(1-3) Identification of Voice Dialogue Area

Then, the specification unit 123 specifies the voice dialogue area 40 on the basis of the specified gaze area 42 and the positional relationship determined by the determination unit 121. For example, in a case where the user 20b is located in the direction of the gaze area 42 of the user 20a, it can be said that the user 20a is looking at the user 20b. Therefore, as illustrated in FIG. 4, the specification unit 123 specifies that the voice dialogue area 40 is present between the user 20a and the user 20b. The voice dialogue area 40 has, for example, a conical shape with a position between both eyes of the user 20a as a vertex and the gaze area 42 of the user 20a as a bottom surface. Note that the shape of the voice dialogue area 40 is not particularly limited, and may be any shape.

(1-4) Specification of Avatar Display Area

Further, the specification unit 123 specifies an avatar display area 50a on the basis of the specified voice dialogue area 40a and the visual field information detected by the detection unit 122. First, the detection unit 122 detects the peripheral visual field of the user 20a in advance as the visual field information. In a case where the voice dialogue area 40a is specified on the basis of the gaze point 41 of the user 20a, the detection unit 122 further detects a central visual field 52 of the user 20a. Then, the specification unit 123 specifies an area outside the voice dialogue area 40a, outside a central visual field 52a of the user 20a, and inside a peripheral visual field 54a of the user 20a as the avatar display area 50a.

By specifying the avatar display area 50a on the basis of the voice dialogue area 40a specified by the specification unit 123 and the visual field information, the avatar control unit 124 can prevent the avatar 30 from being displayed at a position where it is difficult to distinguish the utterance target of the user 20a.

(1-5) Setting of Position of Avatar

Then, the avatar control unit 124 sets the position of the avatar 30a at a position in the avatar display area 50a. The avatar display area 50a is an area specified by the specification unit 123 as an area in which it is easy to distinguish the utterance target of the user 20a. Thus, by the avatar control unit 124 setting the position of the avatar 30a at the position in the avatar display area 50a, the control unit 120 can easily distinguish the utterance target of the user 20a. Note that, in a case where the avatar 30a cannot be displayed at the set position of the avatar 30a, the avatar control unit 124 may reset the position of the avatar 30a. For example, as illustrated in FIG. 5, in a case where an obstacle 80 exists, the avatar control unit 124 sets the position of the avatar 30a at a position displayable by avoiding the obstacle 80. At this time, the avatar control unit 124 may three-dimensionally move the position of the avatar 30a. For example, in a case where the position where a change in the visual line or face direction of the user 20a occurs cannot be secured even if the avatar 30a is moved in the horizontal direction, the avatar control unit 124 may move the avatar 30a in the vertical direction. Thus, when the user 20a makes an utterance to the avatar 30a, the direction of the visual line or face of the user 20a moves in the vertical direction, so that the control unit 120 can distinguish whether or not the utterance target of the user 20a is the avatar 30a.

Figure 6:
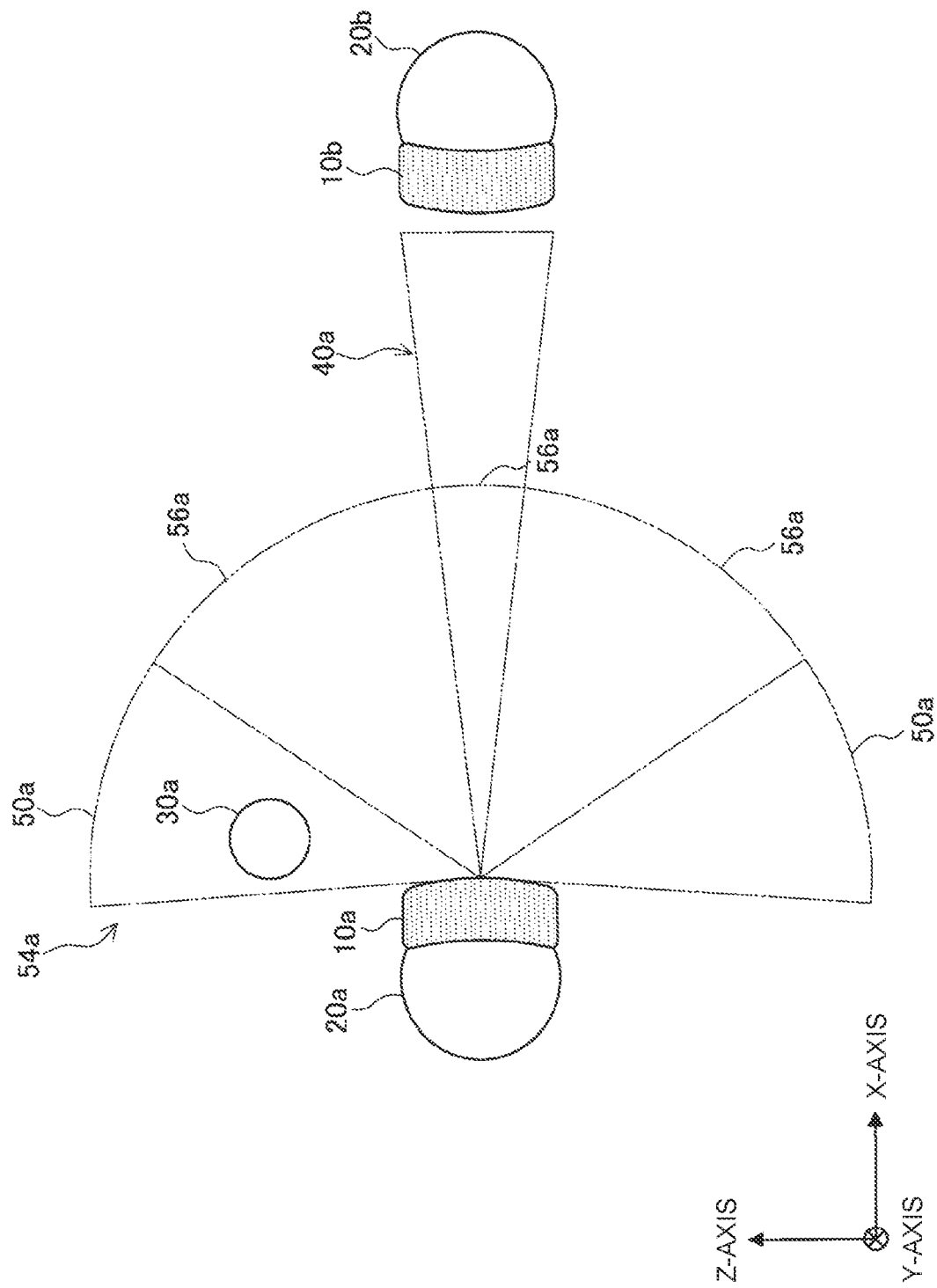
FIG. 6 is a diagram illustrating the voice dialogue area and the avatar display area based on a face direction according to the same embodiment.

(2) Identification of Voice Dialogue Area Based on Face Direction and Setting of Avatar Position The specification of the voice dialogue area based on the visual line and the setting of the position of the avatar have been described above. Next, an example in which the information processing terminal 10a specifies the voice dialogue area 40a and sets the avatar 30a on the basis of the face direction of the user 20a will be described. FIG. 6 is a diagram illustrating the voice dialogue area and the avatar display area based on the face direction according to the present embodiment. Note that the specification of the voice dialogue area 40a and the setting of the position of the avatar 30a are performed, on the basis of the face direction, in a case where it is difficult to detect the visual line of the user 20a.

(2-1) Detection of Face Direction

First, the detection unit 122 detects the direction of the face of the user 20a as the visual line direction information on the basis of the inertia information of the user 20a acquired as the visual line detection information.

(2-2) Identification of visual Line Movement Area

Next, as illustrated in FIG. 6, the specification unit 123 specifies the voice dialogue area 40a on the basis of the face direction of the user 20a and the positional relationship determined by the determination unit 121. For example, as illustrated in FIG. 6, the specification unit 123 specifies a direction in which the user 20a is facing and a space between the user 20a and the user 20b as the voice dialogue area 40a. The specification unit 123 further specifies a visual line movement area 56a that is an area where the user 20a can move the visual line. Further, the specification unit 123 specifies the visual line movement area 56a from, for example, an angle at which the general user 20 can move the visual line. Note that a method by which the specification unit 123 specifies the visual line movement area 56a is not particularly limited.

(2-3) Identification of Avatar Display Area

As illustrated in FIG. 6, the avatar control unit 124 specifies a position outside the voice dialogue area 40a, outside the visual line movement area 56a, and in the peripheral visual field 54a of the user 20a as the avatar display area 50a.

(2-4) Setting of Position of Avatar

Then, the avatar control unit 124 sets the position of the avatar 30a at a position in the avatar display area 50a. Note that, in a case where the avatar 30a cannot be displayed at the set position of the avatar 30a, the avatar control unit 124 may reset the position of the avatar 30a as described in "(1-5) Setting of position of avatar" described above.

In a case where the visual line of the user 20a cannot be detected, the voice dialogue area 40a can be specified by detecting the face direction of the user 20a. Further, by the specification unit 123 also specifying the visual line movement area 56a, the avatar control unit 124 can prevent the avatar 30 from being displayed at a position that is near the voice dialogue area 40a and at which it is difficult to distinguish the utterance target of the user 20a.

(3) Static Specification of Voice Dialogue Area

The specification of the voice dialogue area based on the face direction and the setting of the position of the avatar have been described above. Next, static specification of the voice dialogue area will be described. In the above example, an example in which the voice dialogue area is dynamically specified has been described, but the voice dialogue area may be statically specified.

For example, the specification unit 123 specifies an area in which it is estimated that the voice dialogue between the user 20a and the user 20b can be performed as the voice dialogue area 40a in advance. The specification unit 123 estimates the voice dialogue area 40a on the basis of type and position information of a real object and the position information of the user 20a and the user 20b assumed in a case where the user 20a and the user 20b have a conversation related to the real object. Then, the specification unit 123 specifies the estimated area as the voice dialogue area 40a. For example, in a case where the user 20a is a clerk of a supermarket and the user 20b is a customer of the supermarket, the specification unit 123 specifies, as the voice dialogue area 40a, a space above a cash register stand assumed to be located between the user 20a and the user 20b at the time of payment. Note that the type and position information of the real object and the position information of the user 20a and the user 20b assumed in a case where the user 20a and the user 20b perform a conversation related to the real object can be acquired and managed in advance by a camera, a radio frequency identifier (RFID), or the like.

(4) Specification Example of Voice Dialogue Area and Setting Example of Position of Avatar The static specification of the voice dialogue area has been described above. Next, a specification example of the voice dialogue area and a setting example of the position of the avatar will be described. In the above-described example, a situation in which the user 20a and the user 20b face each other and having a dialogue in a stationary state will be described as an example. Hereinafter, an example in a situation different from the above example will be described.

(4-1) Case of Not Looking at Dialogue Partner

Figure 7:
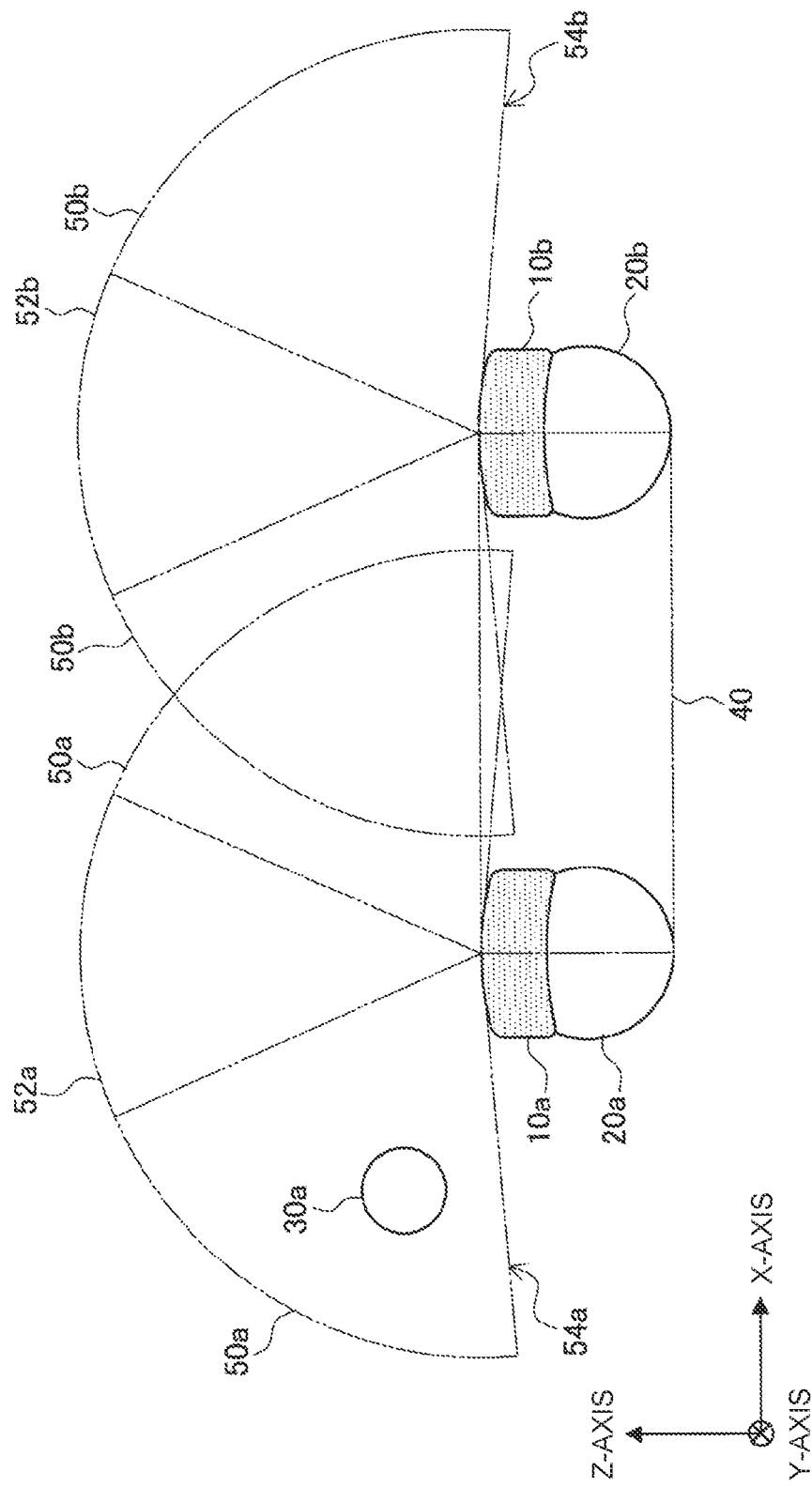
FIG. 7 is a diagram illustrating the voice dialogue area and the avatar display area in a case of not looking at a dialogue partner according to the same embodiment.

First, a situation in which the user 20a is having a dialogue without looking at the user 20b will be described as an example. FIG. 7 is a diagram illustrating the voice dialogue area and the avatar display area in a case of not looking at the dialogue partner according to the present embodiment. As illustrated in FIG. 7, in a case where the user 20a is having a dialogue with the user 20b without looking at the user 20b, the specification unit 123 specifies a space between the user 20a and the user 20b as the voice dialogue area 40 on the basis of the positional relationship between the user 20a and the user 20b. The space between the user 20a and the user 20b is, for example, a columnar space having the head of the user 20a and the head of the user 20b as both ends.

An avatar display area 50 is specified similarly to when looking at the dialogue partner. The position of the avatar 30 is set in the avatar display area 50a on the left side of the user 20a, for example, as illustrated in FIG. 7. When the position of the avatar 30 is set in a common avatar display area in which the avatar display area 50a on the right side of the user 20a and an avatar display area 50b on the left side of the user 20b overlap, the user 20b can also see the avatar 30a of the user 20a. However, in that case, the difference between the position of the avatar displayed in the common avatar display area viewed from the user 20a and the position of the user 20b becomes a slight difference, and thus it becomes difficult to distinguish which of the avatar 30a and the user 20b the utterance of the user 20a is directed to. Thus, as illustrated in FIG. 7, it is desirable that the avatar 30a is displayed in the avatar display area 50a on the left side of the user 20a.

Note that the voice dialogue area 40 in a case of not looking at the dialogue partner may be specified on the basis of the voice information. For example, the specification unit 123 may specify the voice dialogue area 40 on the basis of the position of the dialogue partner specified on the basis of the voice information. Further, the specification unit 123 may specify mutual utterance positions on the basis of voices alternately uttered between the user 20a and the user 20b, and specify a space connecting the specified utterance positions with each other as the voice dialogue area 40.

(4-1-1) Case Where User 20a and User 20b are Moving

Figure 8:
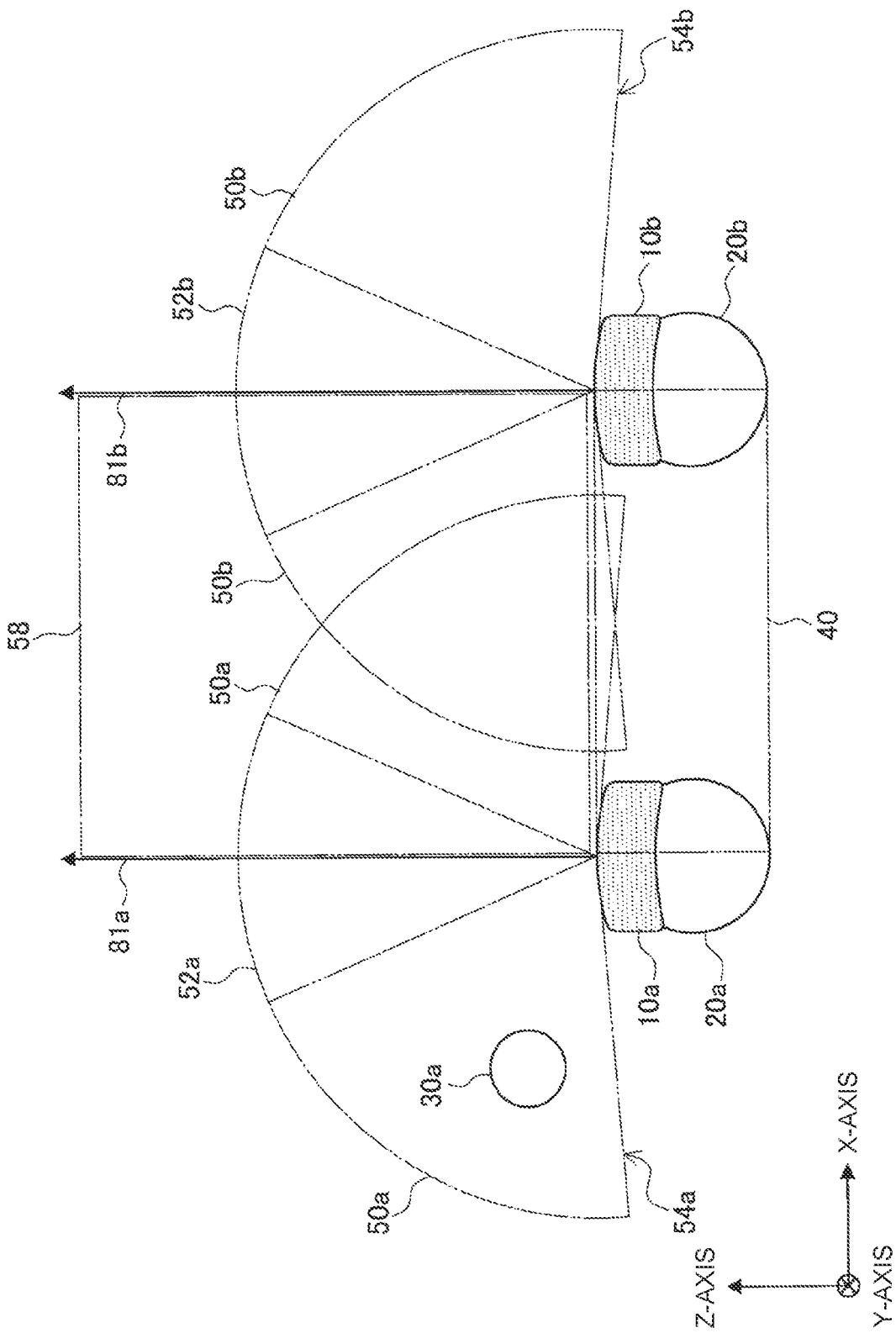
FIG. 8 is a diagram illustrating the voice dialogue area and the avatar display area while moving according to the same embodiment.
Figure 9:
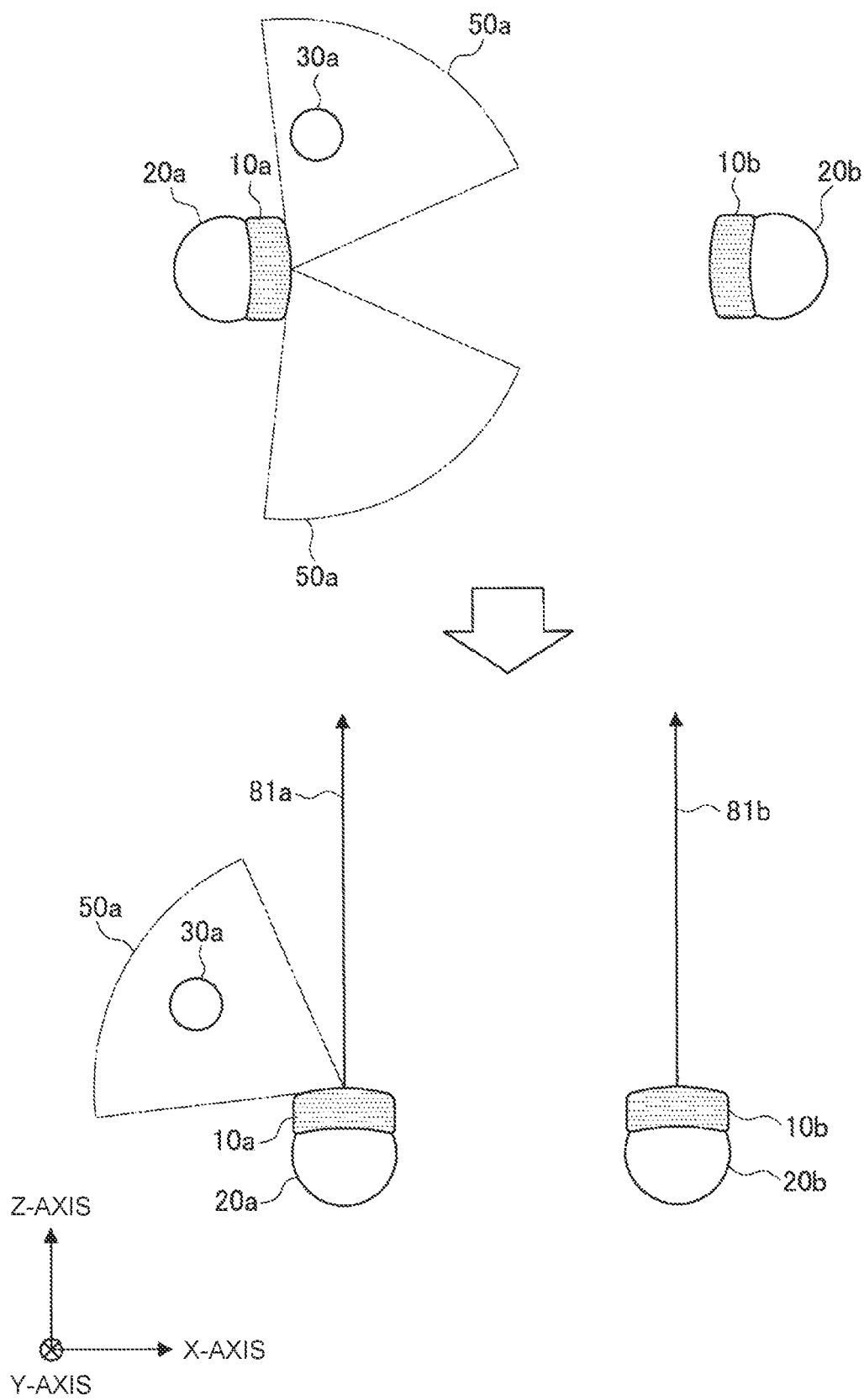
FIG. 9 is a diagram illustrating a change in a position of an avatar at a start of movement in a case where only one user has an avatar according to the same embodiment.
Figure 10:
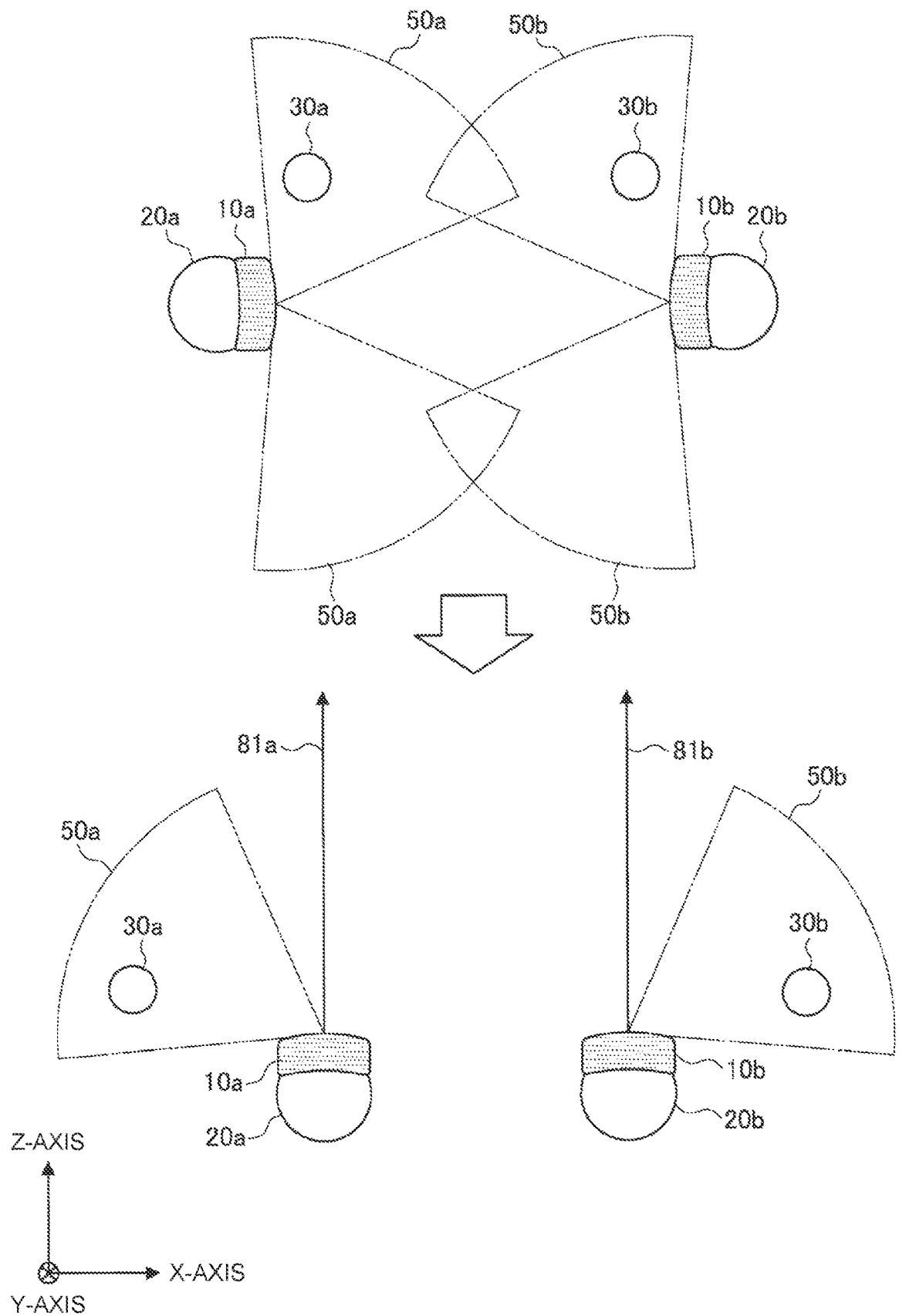
FIG. 10 is a diagram illustrating a change in a position of an avatar at a start of movement in a case where two users have avatars according to the same embodiment.

Next, a case where the user 20a and the user 20b start to move from the situation illustrated in FIG. 7 will be described. FIG. 8 is a diagram illustrating the voice dialogue area and the avatar display area while moving according to the present embodiment. FIG. 9 is a diagram illustrating a change in the position of an avatar at the start of movement in a case where only one user has an avatar according to the present embodiment. FIG. 10 is a diagram illustrating a change in the position of an avatar at the start of movement in a case where two users have avatars according to the present embodiment.

In the example illustrated in FIG. 8, it is assumed that the user 20a and the user 20b move in directions of an arrow 81a and an arrow 81b, respectively. As illustrated in FIG. 8, in a case where the user 20a and the user 20b are moving side by side in parallel, the avatar control unit 124 sets the position of the avatar at a position outside the space in the moving direction of the user 20a and the user 20b. For example, the space between the arrow 81a and the arrow 81b in the moving direction of the user 20a and the user 20b illustrated in FIG. 8 is a space in which it is difficult to distinguish whether the utterance of the user 20a is for the avatar 30a or the user 20b. Therefore, the avatar control unit 124 may set the space as an avatar non-display area 58 that is a space in which the avatar 30a is not displayed. Therefore, in the example illustrated in FIG. 8, as in the case of the example illustrated in FIG. 7, the avatar control unit 124 causes display of the avatar 30a in the avatar display area 50a on the left side of the user 20a.

Note that, in a case where a change occurs in the directions of the user 20a and the user 20b at the start of movement of the user 20a and the user 20b, the avatar control unit 124 may change the position of the avatar 30 according to the change. For example, in an upper diagram of FIG. 9, the user 20a and the user 20b face each other, and only the avatar 30a of the user 20a is displayed in the avatar display area 50a on the left side of the user 20a. From this state, the user 20a starts to move by changing the direction in the Z-axis direction as illustrated in a lower diagram of FIG. 9. At this time, in accordance with rotation of the user 20a in the left direction, the avatar control unit 124 also rotates the positions of the avatar display area 50a and the avatar 30a in the left direction around the position of the user 20a.

Further, in an upper diagram of FIG. 10, the user 20a and the user 20b face each other, and the avatar 30a of the user 20a is displayed in the avatar display area 50a on the left side of the user 20a, and the avatar 30b of the user 20b is displayed in the avatar display area 50b on the right side of the user 20b. From this state, as illustrated in the lower diagram of FIG. 9, the user 20a and the user 20b change directions in the Z-axis direction and start moving. At this time, in accordance with rotation of the user 20a in the left direction, the avatar control unit 124 also rotates the positions of the avatar display area 50a and the avatar 30a in the left direction around the position of the user 20a. Further, in accordance with rotation of the user 20b in the right direction, the avatar control unit 124 also rotates the positions of the avatar display area 50b and the avatar 30b in the right direction around the position of the user 20b.

As described above, when the user 20 moves with a direction change, the avatar control unit 124 changes the display position of the avatar 30 according to the change in the direction of the user 20. Thus, the avatar control unit 124 can display the avatar 30 without interfering the movement of the user 20. Further, as illustrated in FIGS. 9 and 10, the avatar control unit 124 can set the position of the avatar 30 viewed from the user 20 to the same position before and after the direction change of the user 20. Thus, the user 20 can move without losing the avatar 30 due to the direction change. Further, when moving the avatar 30, the avatar control unit 124 may move the avatar 30 so that the user knows the movement path of the avatar 30, such as displaying the movement path of the avatar 30. Thus, the avatar control unit 124 can make it easier for the user 20 to recognize the position of the avatar 30 after movement.

(4-1-2) Case Where User 20a is Working

Figure 11:
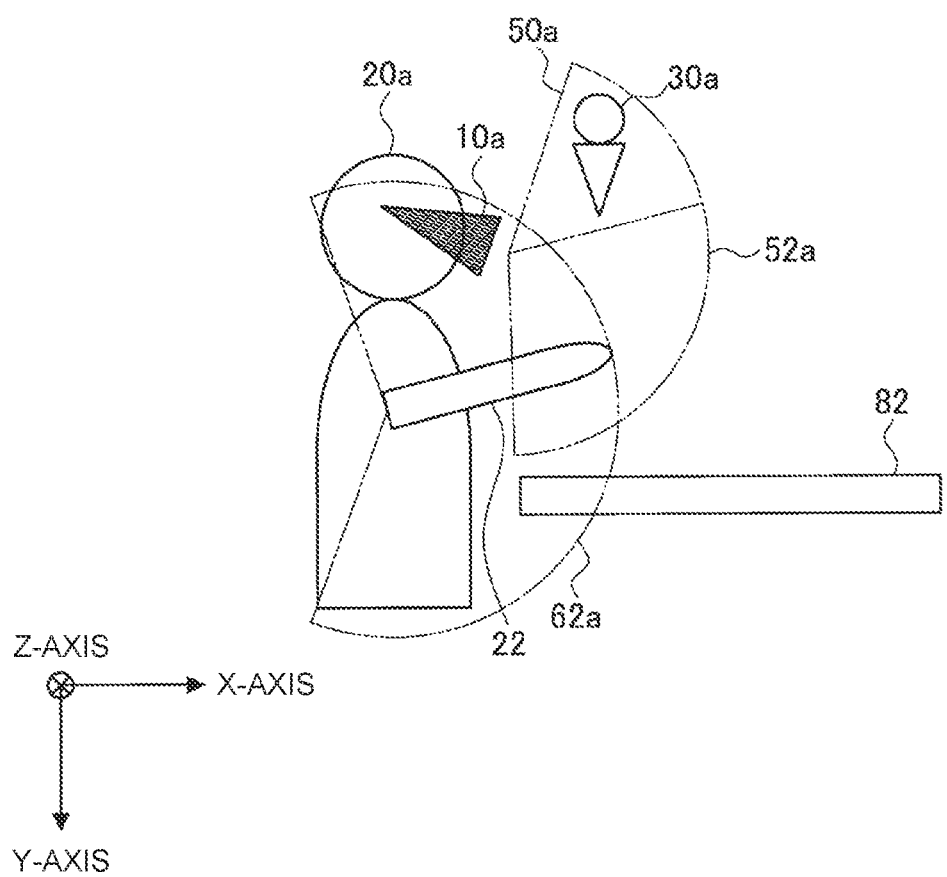
FIG. 11 is a diagram illustrating the voice dialogue area and the avatar display area while working according to the same embodiment.
Figure 12:
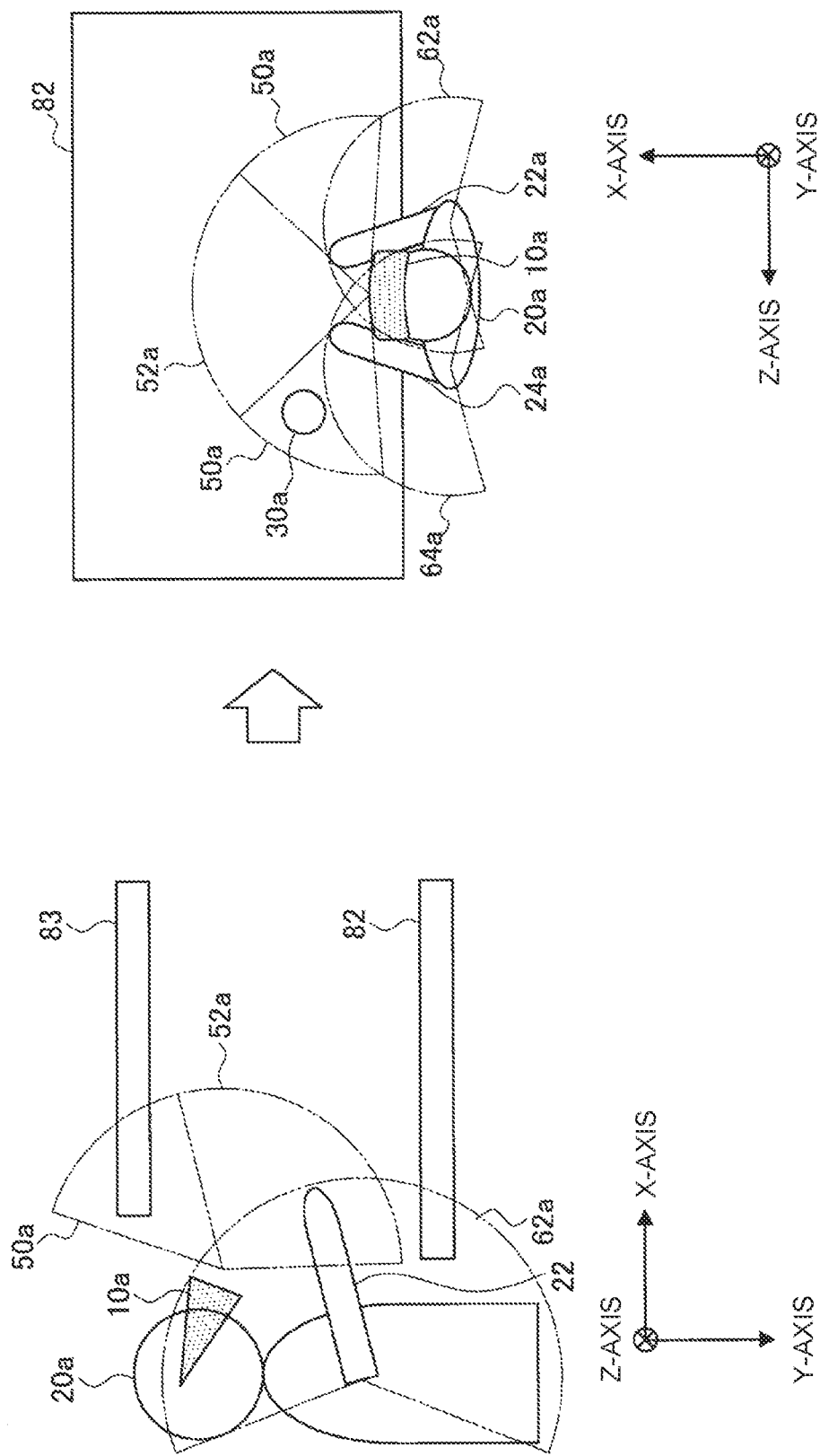
FIG. 12 is a diagram illustrating an example of display of an avatar in consideration of a shielding object according to the same embodiment.

Next, a situation in which the user 20a is having a dialogue without looking at the user 20b while working will be described as an example. FIG. 11 is a diagram illustrating the voice dialogue area and the avatar display area while working according to the present embodiment. FIG. 12 is a diagram illustrating an example of display of an avatar in consideration of a shielding object according to the present embodiment.

For example, in a case where the user 20a is working, the avatar control unit 124 sets the position of the avatar 30a at a position outside a work area that is an area where the user 20a performs work. The work area is specified on the basis of, for example, a movable range of the arms of the user 20a. Specifically, as illustrated in FIG. 11, in a case where the movable range of the right arm 22a of the user 20a is a movable range 62a, the avatar control unit 124 specifies a movable range 62 as the work area. The avatar control unit 124 specifies the work area as the avatar non-display area that is an area in which the avatar 30a is not displayed. Then, the avatar control unit 124 sets the position of the avatar 30a outside the area. For example, the avatar control unit 124 sets the position of the avatar 30a at a position in the avatar display area 50a illustrated in FIG. 11. Further, the central visual field 52a of the user 20a is a visual field in which the user 20a is looking at a work target or the like. Therefore, the avatar control unit 124 sets the position of the avatar 30a so as not to display the avatar 30 also in the central visual field 52a. Thus, the avatar control unit 124 can display the avatar 30a at a position that does not interfere with the work of the user 20a.

Note that the avatar control unit 124 may specify all spaces on a work table 82 as avatar non-display areas in which the avatar 30a is not displayed. Further, in a case where it is detected that the user 20a is working on information, the avatar control unit 124 may set the position of the avatar 30a so that the avatar 30a is not displayed above.

Further, in a case where the movable range of the arm of the user 20a and the peripheral visual field are detected, the avatar control unit 124 sets the position of the avatar 30a outside the movable range of the arm and within the peripheral visual field. Further, in a case where there is no place where the position of the avatar 30a can be set outside the movable range of the arm, the avatar control unit 124 may set the position of the avatar 30a at a position where the arm is less likely to move within the movable range of the arm and at a position within the peripheral visual field. Further, in a case where there is no place where the position of the avatar 30a can be set, the avatar control unit 124 may present the position of the avatar 30a to the user 20a by an object such as an arrow or voice.

The control unit 120 detects whether or not the user 20a is working on the basis of the information acquired by the acquisition unit 110. For example, in a case where it is detected from an image captured by the outward imaging device that the user 20a is moving a hand or a leg, and it is detected from visual line direction information of the user 20a that the user 20a is looking at the hand or the leg, the control unit 120 determines that the user 20a is working.

In a case where it is detected that the user 20a is working, the avatar control unit 124 may set the position of the avatar 30a to a position considering the dominant hand of the user 20a. For example, the avatar control unit 124 sets the position of the avatar 30a on the side opposite to the dominant hand of the user 20a. The avatar control unit 124 specifies the dominant hand of the user 20a on the basis of information registered in advance in the user 20a. Note that, in a case where the information regarding the dominant hand of the user 20a is not registered, the avatar control unit 124 may set the right hand as default setting.

Further, in a case where only the movable range of the arm of the user 20a is detected, the control unit 120 estimates the current visual line of the user 20a on the basis of the visual line detected immediately before. Then, the control unit 120 may detect whether or not the user 20a is working on the basis of the detected movable range of the arm and the estimated visual line of the user 20a.

Further, the control unit 120 may learn movement of the arm of the user 20a by detecting movement of the arm of the user 20a for a certain period of time, and detect the movable range of the arm of the user 20a on the basis of the learned result.

Further, in a case where a shielding object such as a shelf 83 exists in the avatar display area 50a illustrated in a left diagram of FIG. 12, it is desirable that the avatar 30a is not displayed at the position of the shielding object. Accordingly, as illustrated in a right diagram of FIG. 12, the avatar control unit 124 causes display of the avatar 30a outside the movable range 62a of the right arm 22a and a movable range 64a of a left arm 24a of the user 20a and at a position where the shelf 83 does not exist in the avatar display area 50a. Note that the control unit 120 may perform detection by registering information regarding the shielding object in advance, or may perform detection by general object recognition.

(4-2) Case where Avatars of Each Other can be Used

Figure 13:
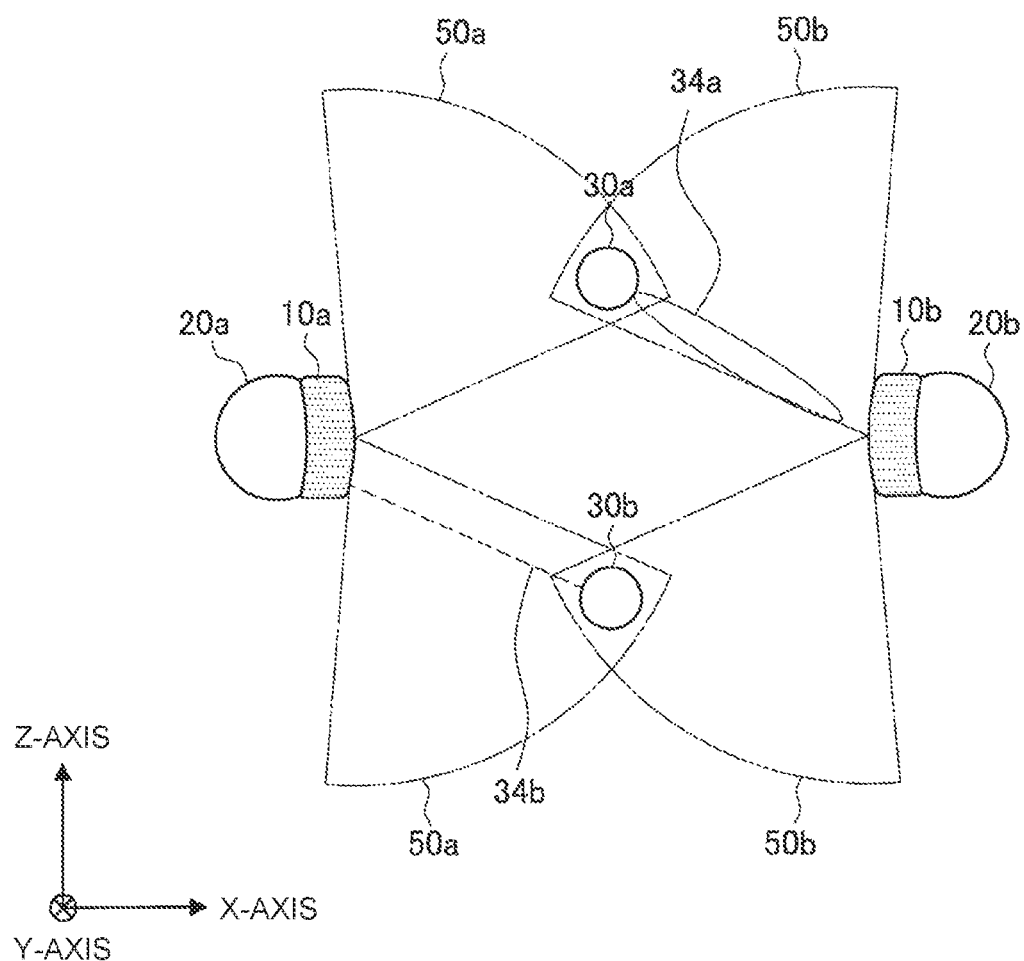
FIG. 13 is a diagram illustrating a presentation example of statuses of avatars according to the same embodiment.

Next, a case where the user 20a and the user 20b can use the avatars 30 of each other will be described. FIG. 13 is a diagram illustrating a presentation example of statuses of avatars according to the present embodiment. In a case where the user 20a and the user 20b can use the avatars 30 of each other, the avatar control unit 124 sets the position of each avatar 30 in a common avatar display area of the user 20a and the user 20b. For example, as illustrated in FIG. 13, the avatar control unit 124 sets the position of the avatar 30a of the user 20a in the common avatar display area of the avatar display area 50a on the left side of the user 20a and the avatar display area 50b on the right side of the user 20b. Further, the avatar control unit 124 sets the position of the avatar 30b of the user 20b in the common avatar display area of the avatar display area 50a on the right side of the user 20a and the avatar display area 50b on the left side of the user 20b. Thus, the user 20a and the user 20b can view the avatars 30 of each other, and can have a dialogue with either of the avatars 30.

Note that, in a case where the user 20a and the user 20b can use the avatars 30 of each other, it may be difficult to distinguish which user 20 is using which avatar 30. Accordingly, the avatar control unit 124 may display a status indicating the status of use of the avatar 30. For example, as illustrated in FIG. 13, in a case where the user 20b is using the avatar 30a, the avatar control unit 124 may display a status 34a indicating that the user 20b is using the avatar 30a. Further, in a case where the user 20a is using the avatar 30b, the avatar control unit 124 may display a status 34b indicating that the user 20a is using the avatar 30b. The status may indicate that the user 20b and the avatar 30a are connected by a circle as in the status 34a, or may indicate that the user 20a and the avatar 30b are connected by a line (broken line) as in the status 34b. Thus, the user 20 can visually recognize the status of use of the avatar 30.

Further, the avatar control unit 124 may separate the positions of the avatar 30a and the avatar 30b so that it can be distinguished which avatar 30 the utterance of each user 20 is directed to. Further, when the user 20a utters to the avatar 30a, the avatar control unit 124 may cause the avatar 30b to have a distance from the avatar 30a, so that the utterance target can be easily distinguished.

(4-3) Case Where Common Avatar is Used

Figure 14:
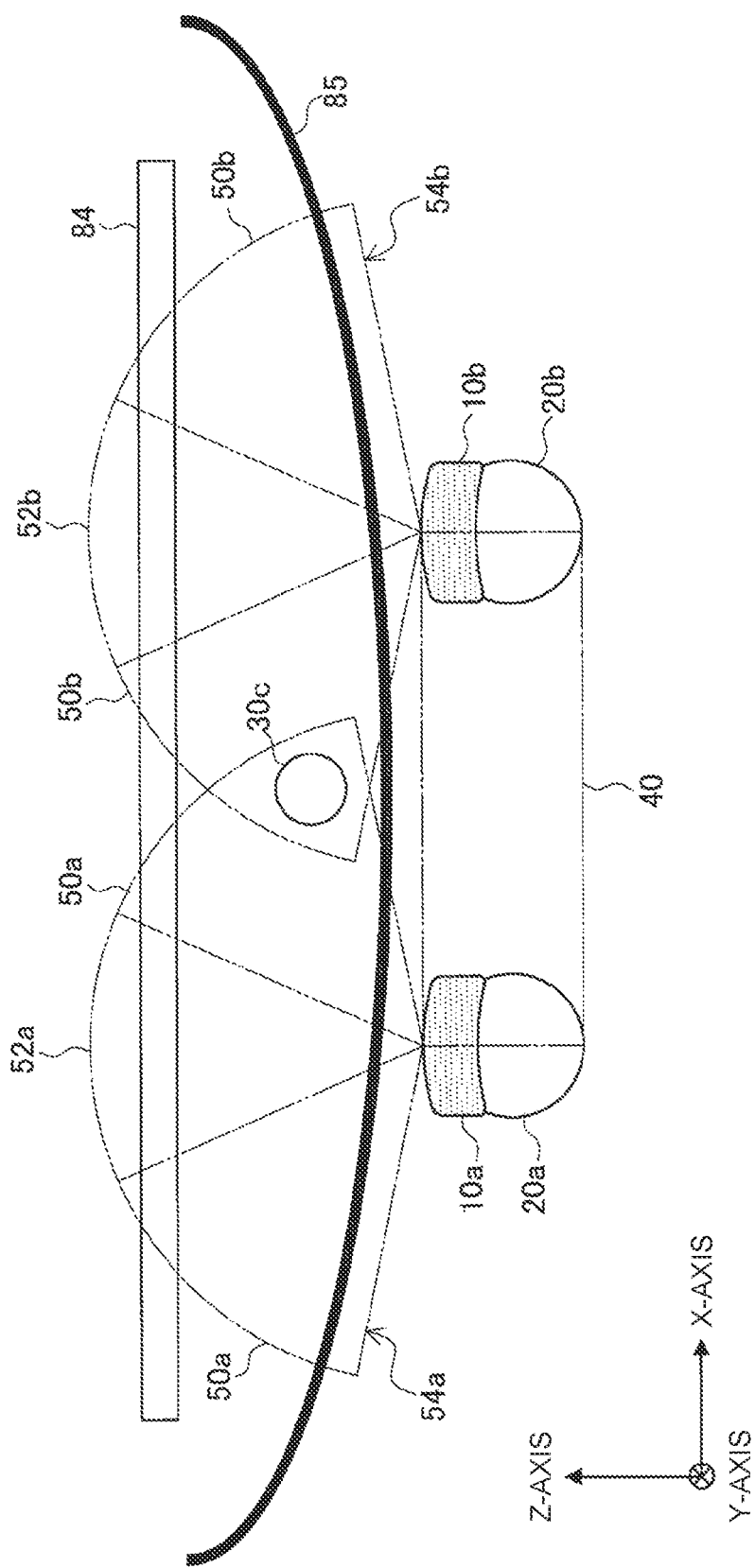
FIG. 14 is a diagram illustrating a display example of an avatar in a case where the avatar according to the same embodiment is shared and there is a common peripheral visual field.
Figure 15:
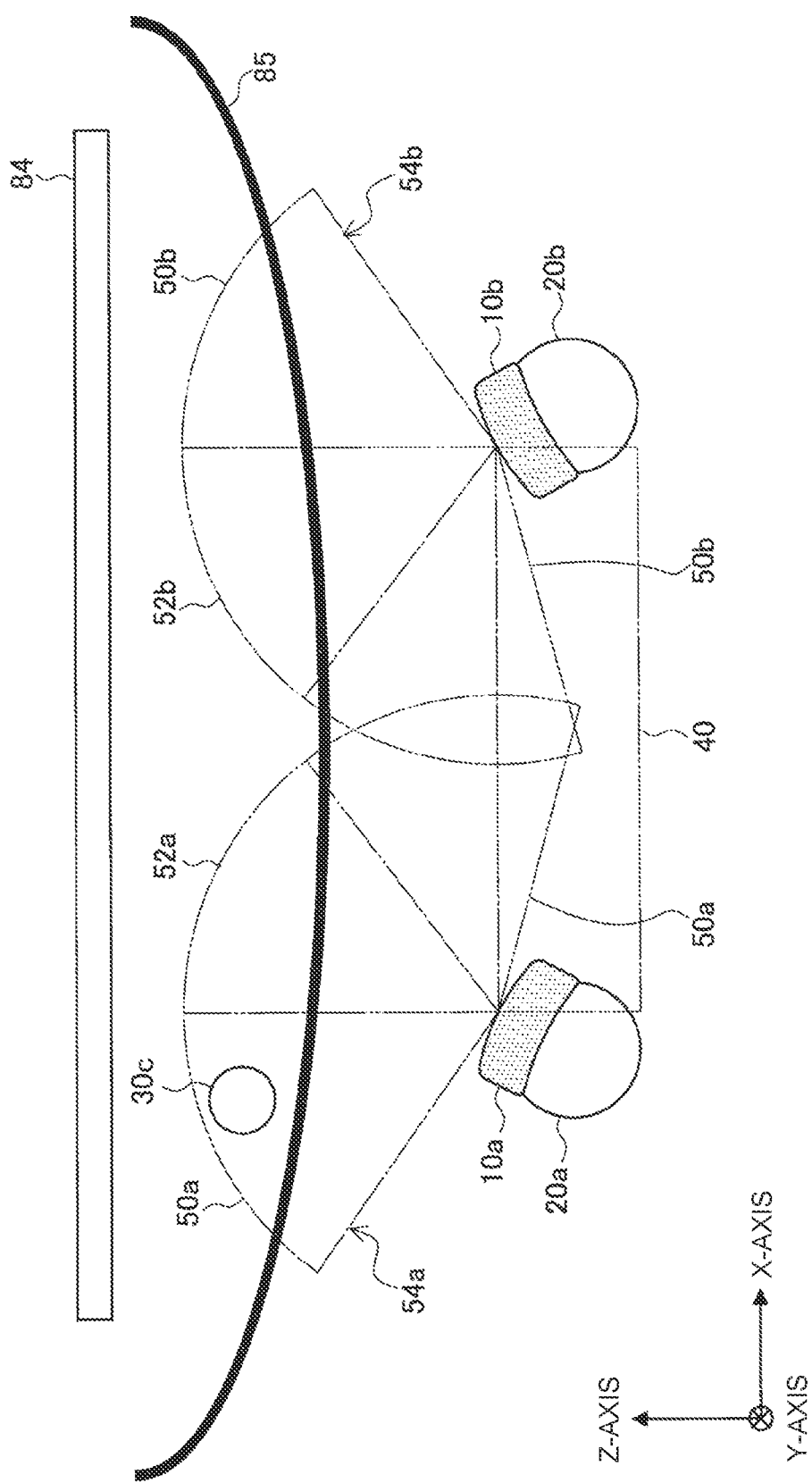
FIG. 15 is a diagram illustrating a display example of the avatar in a case where the avatar according to the same embodiment is shared and, although there is a common peripheral visual field, the avatar is displayed outside the common peripheral visual field.
Figure 16:
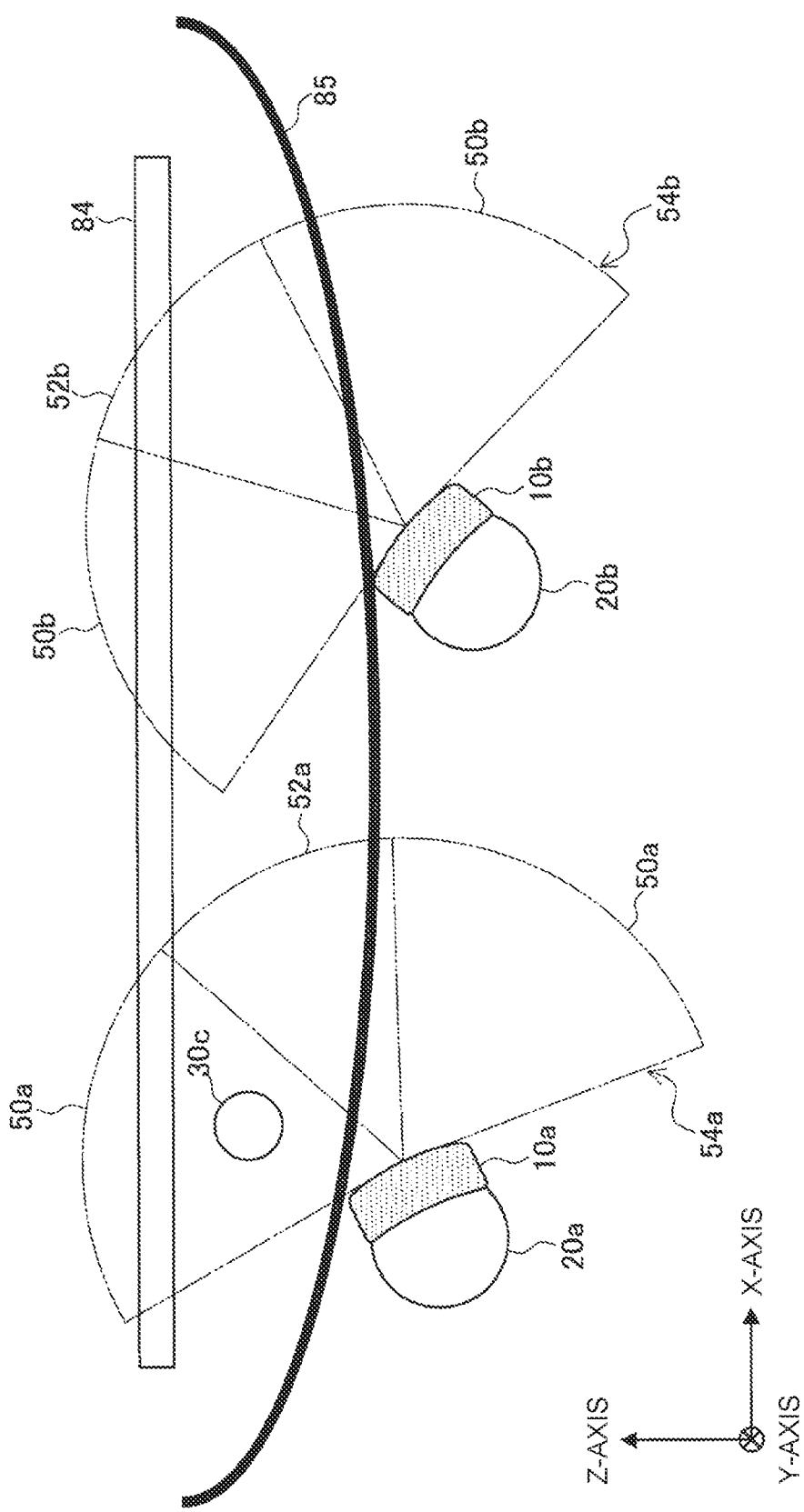
FIG. 16 is a diagram illustrating a display example of the avatar in a case where the avatar according to the same embodiment is shared and there is no common peripheral visual field.

Next, a case where the user 20a and the user 20b use a common avatar 30c will be described. FIG. 14 is a diagram illustrating a display example of an avatar in a case where the avatar according to the present embodiment is shared and there is a common peripheral visual field. FIG. 15 is a diagram illustrating a display example of the avatar in a case where the avatar according to the present embodiment is shared and, although there is a common peripheral visual field, the avatar is displayed outside the common peripheral visual field. FIG. 16 is a diagram illustrating a display example of the avatar in a case where the avatar according to the present embodiment is shared and there is no common peripheral visual field. In the example illustrated in FIGS. 14 to 16, an example in which the user 20a and the user 20b share a tourist guide avatar 30c for describing an exhibit 84 will be described. Note that the display position of the avatar 30c for tourism guidance is desirably set near the target to be guided. For example, as illustrated in FIG. 14, it is desirable that the avatar 30c for tourism guidance is at a position not apart from the exhibit 84 by a certain distance or more for convenience of describing the exhibit 84. Therefore, in the example illustrated in FIGS. 14 to 16, it is assumed that the avatar 30c is located closer to the exhibit 84 side (hereinafter also referred to as "inside the line 85")

than the line 85. The line 85 is a boundary line of a space where the distance from the exhibit 84 is within a predetermined distance.

In a case where the user 20a and the user 20b use a common avatar, the avatar control unit 124 sets the position of the common avatar 30c in a common space between the peripheral visual field 54a of the user 20a and a peripheral visual field 54b of the user 20b. Thus, the user 20a and the user 20b can simultaneously view the shared avatar 30c. For example, in the example illustrated in FIG. 14, the common space between the peripheral visual field 54a of the user 20a and the peripheral visual field 54b of the user 20b is a common space between the avatar display area 50a on the right side of the user 20a and the avatar display area 50b on the left side of the user 20b. Therefore, the avatar control unit 124 sets the position of the common avatar 30c in the common space. Since the position of the common avatar 30c illustrated in FIG. 14 is inside the line 85, the avatar control unit 124 can display the common avatar 30c at the position.

However, the common space between the peripheral visual field 54a of the user 20a and the peripheral visual field 54b of the user 20b is not necessarily inside the line 85. For example, in the example illustrated in FIG. 15, the common space between the peripheral visual field 54a of the user 20a and the peripheral visual field 54b of the user 20b is a common space between the avatar display area 50a on the right side of the user 20a and the avatar display area 50b on the left side of the user 20b. The space is outside the line 85. Thus, the avatar control unit 124 cannot set the position of the common avatar 30c in this space. In this case, the avatar control unit 124 selects either the peripheral visual field 54a of the user 20a or the peripheral visual field 54b of the user 20b, and sets the position of the avatar 30c common to a selected peripheral visual field 54. Thus, the avatar control unit 124 can show the common avatar 30c to at least one of the user 20a or the user 20b. In the example illustrated in FIG. 15, the avatar control unit 124 selects the peripheral visual field 54a of the user 20a, and further sets the position of the common avatar 30c in the avatar display area 50a on the left side of the user 20a inside the line 85. Thus, at least the user 20a can see the common avatar 30c.

Further, there may be a case where there is no common space between the peripheral visual field 54a of the user 20a and the peripheral visual field 54b of the user 20b. In that case, as in the example illustrated in FIG. 15, the avatar control unit 124 selects either the peripheral visual field 54a of the user 20a or the peripheral visual field 54b of the user 20b, and sets the position of the avatar 30c common to the selected peripheral visual field 54. For example, in the example illustrated in FIG. 16, there is no common space between the peripheral visual field 54a of the user 20a and the peripheral visual field 54b of the user 20b. Accordingly, the avatar control unit 124 selects the peripheral visual field 54a of the user 20a, and further sets the position of the common avatar 30c in the avatar display area 50a on the left side of the user 20a inside the line 85. Thus, at least the user 20a can see the common avatar 30c.

Note that, in the example illustrated in FIGS. 15 and 16, the user 20b cannot see the common avatar 30c, and may lose sight of the position of the common avatar 30c. Accordingly, the avatar control unit 124 may notify the user 20 for whom the common avatar 30c is not displayed of the position of the common avatar 30c by displaying an object such as an arrow or outputting a voice.

Note that the avatar control unit 124 may change the position of the common avatar 30c according to the situation. For example, it is assumed that a common avatar 30c is displayed in the avatar display area 50a of the user 20a. At this time, in a case where there is an utterance from the user 20b to the common avatar 30c, the avatar control unit 124 may change the position of the common avatar 30c to the avatar display area 50b of the user 20b.

Further, as in the example illustrated in FIG. 14, it is assumed that the avatar control unit 124 sets the position of the common avatar 30c in the common space of the peripheral visual field 54a of the user 20a and the peripheral visual field 54b of the user 20b. At this time, in a case where it is difficult to distinguish whether the utterance target of the user 20a is the common avatar 30c or the user 20b, the avatar control unit 124 may select the peripheral visual field 54a of the user 20a or the peripheral visual field 54b of the user 20b as the position of the common avatar 30c.

Further, in a case where the position of each user 20 has moved, the avatar control unit 124 desirably resets the position of the common avatar 30c to a position visible from each user 20.

(5) Cancellation of Voice Dialogue Area

The specific example of the voice dialogue area and the setting example of the position of the avatar have been described above. Next, cancellation of the voice dialogue area 40a will be described.

(5-1) Case where Voice Dialogue has Ended

In a case where there is no utterance of the user 20b even after a lapse of a certain period of time or more from the end of an utterance of the user 20a, the avatar control unit 124 considers that the voice dialogue has ended, and cancels the voice dialogue area 40a. Further, in a case where the gaze point 41a of the user 20a is out of the user 20b even within a certain period of time after the end of an utterance of the user 20a, the avatar control unit 124 may cancel the voice dialogue area 40a.

(5-2) Case where Voice Dialogue with New Dialogue Partner has Started

Even in a state where the dialogue between the user 20a and the user 20b has not ended, in a case where a dialogue with a new user 20c is started and the gaze point 41a of the user 20a faces the user 20c, the avatar control unit 124 cancels the voice dialogue area 40a with the user 20b. Then, the avatar control unit 124 newly specifies the voice dialogue area 40a with the user 20c.

Note that, in a case where a dialogue with a plurality of users 20 continues within a certain period of time, the avatar control unit 124 maintains a plurality of voice dialogue areas 40 for the plurality of users 20. For example, it is assumed that the user 20a is having a dialogue with the user 20b and the user 20c, and the gaze point 41a of the user 20a is directed to each of the user 20b and the user 20c. At this time, the avatar control unit 124 maintains the voice dialogue area 40a for each of the user 20b and the user 20c.

<1-4. Display Example of Avatar on Display Unit>

The voice dialogue area and the display position of the avatar according to the present embodiment have been described above. Next, a display example of an avatar 30a on the display unit 140 according to the present embodiment will be described. Display of the avatar 30a on the display unit 140 changes according to a position viewed by the user 20a on the display unit 140 and performance of the display unit 140.

Figure 17:
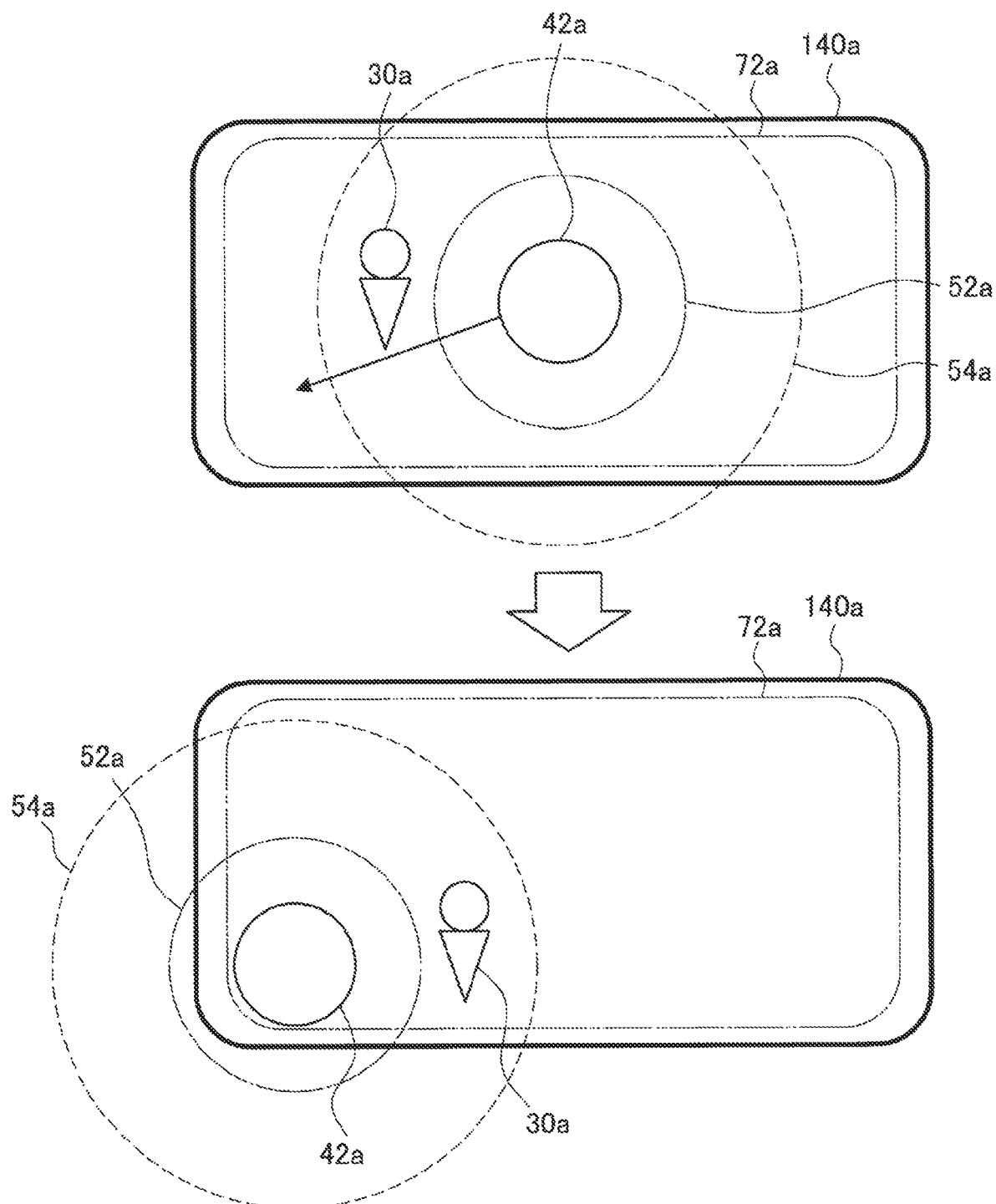
FIG. 17 is a diagram illustrating a display example of the avatar on a display unit in a case where the visual line is moved within the visual line detection area when the avatar according to the same embodiment is displayed.

FIG. 17 is a diagram illustrating a display example of the avatar on the display unit in a case where the visual line is moved within the visual line detection area when the avatar according to the present embodiment is displayed. In an upper diagram of FIG. 17, a gaze area 42a of the user 20a is located in a visual line detection area 72a smaller than a display unit 140a. Around the gaze area 42a, the central visual field 52a and the peripheral visual field 54a of the user 20a are present as illustrated in the upper diagram of FIG. 17. Then, the avatar 30a is displayed inside the display unit 140, outside the gaze area 42a, outside the central visual field 52a, and inside the peripheral visual field 54a.

It is assumed that the gaze area 42a has moved from the state illustrated in the upper diagram of FIG. 17 described above in the direction of an arrow illustrated in the upper diagram of FIG. 17 to a position in the visual line detection area 72a, and has transitioned to a state illustrated in a lower diagram of FIG. 17. At this time, in the display unit 140, there is an area where the avatar 30a can be displayed outside the gaze area 42a, outside the central visual field 52a, and inside the peripheral visual field 54a, and thus the avatar 30a is displayed as illustrated in the lower diagram of FIG. 17.

Figure 18:
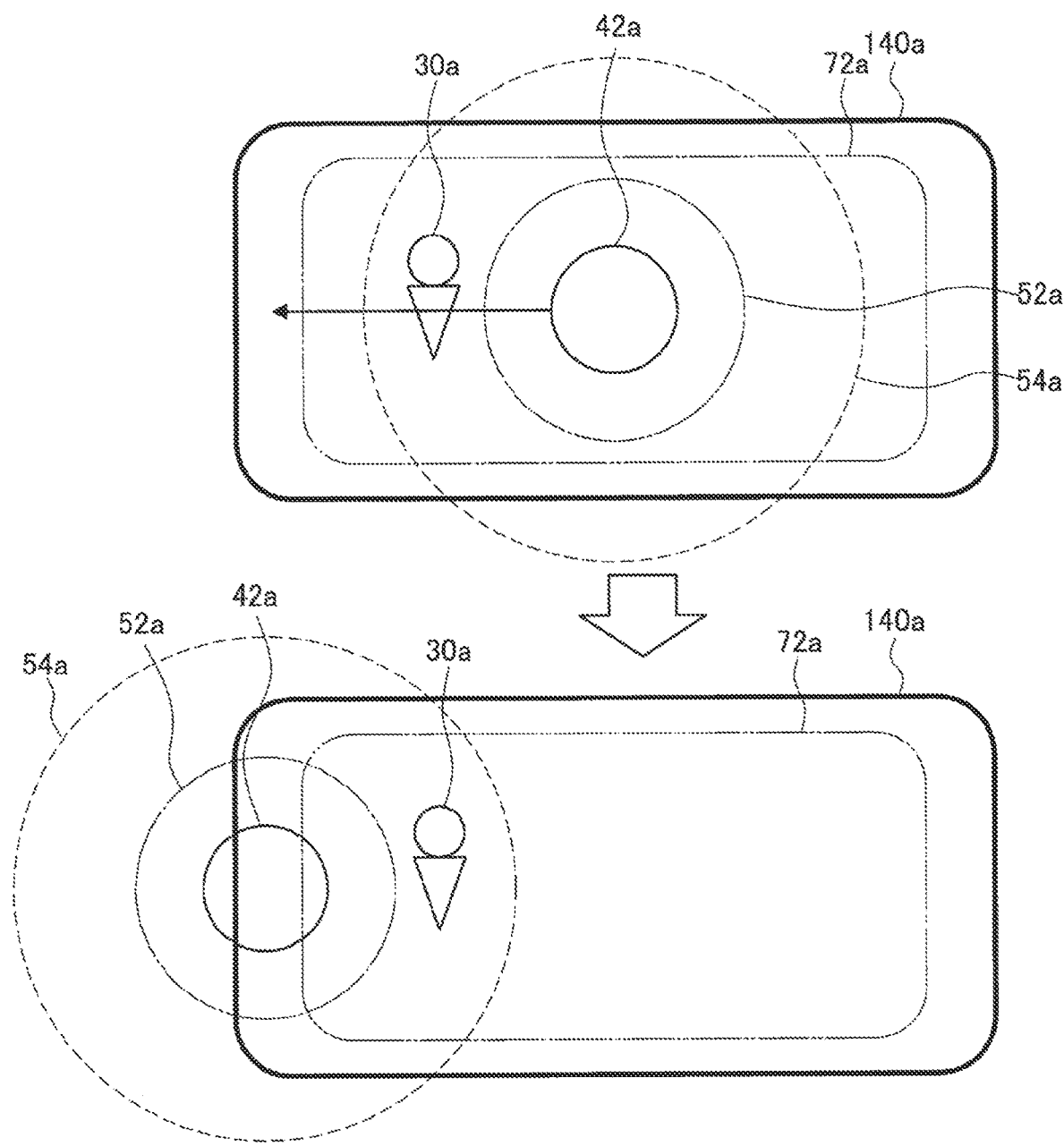
FIG. 18 is a diagram illustrating a display example of the avatar on the display unit in a case where the visual line is moved to the outside of the visual line detection area when the avatar according to the same embodiment is displayed.

FIG. 18 is a diagram illustrating a display example of the avatar on the display unit in a case where the visual line is moved to the outside of the visual line detection area when the avatar according to the present embodiment is displayed. In an upper diagram of FIG. 18, the gaze area 42a of the user 20a is located in the visual line detection area 72a smaller than the display unit 140a. Around the gaze area 42a, the central visual field 52a and the peripheral visual field 54a of the user 20a are present as illustrated in the upper diagram of FIG. 18. Then, the avatar 30a is displayed inside the display unit 140, outside the gaze area 42a, outside the central visual field 52a, and inside the peripheral visual field 54a.

It is assumed that the user 20a has moved in the gaze area 42a from the state in the upper diagram of FIG. 18 described above in the direction of an arrow illustrated in the upper diagram of FIG. 18 to a position outside the visual line detection area 72a, and has transitioned to a state illustrated in a lower diagram of FIG. 18. At this time, since the gaze area 42a has moved to the outside of the visual line detection area 72a, the visual line of the user 20a is no longer detected. In that case, it becomes difficult for the control unit 120 to determine how to control the display of the avatar 30a. Accordingly, for example, the control unit 120 estimates the position of the gaze area 42a after movement on the basis of movement of the gaze area 42a immediately before the gaze area 42a moves to the outside of the visual line detection area 72a. The control unit 120 can also estimate the positions of the central visual field 52a and the peripheral visual field 54a by estimating the position of gaze area 42a. Thus, the control unit 120 can determine how to control the display of the avatar 30a on the basis of the estimation result.

For example, in a case where it is estimated that the position of the gaze area 42a after movement has moved to a position illustrated in the lower diagram of FIG. 18, the positions of the central visual field 52a and the peripheral visual field 54a are also estimated as illustrated in the lower diagram of FIG. 18. At this time, there is an area where the avatar 30a can be displayed inside the display unit 140, outside the gaze area 42a, outside the central visual field 52a, and inside the peripheral visual field 54a, and thus the avatar 30a is displayed as illustrated in the lower diagram of FIG. 18.

Figure 19:
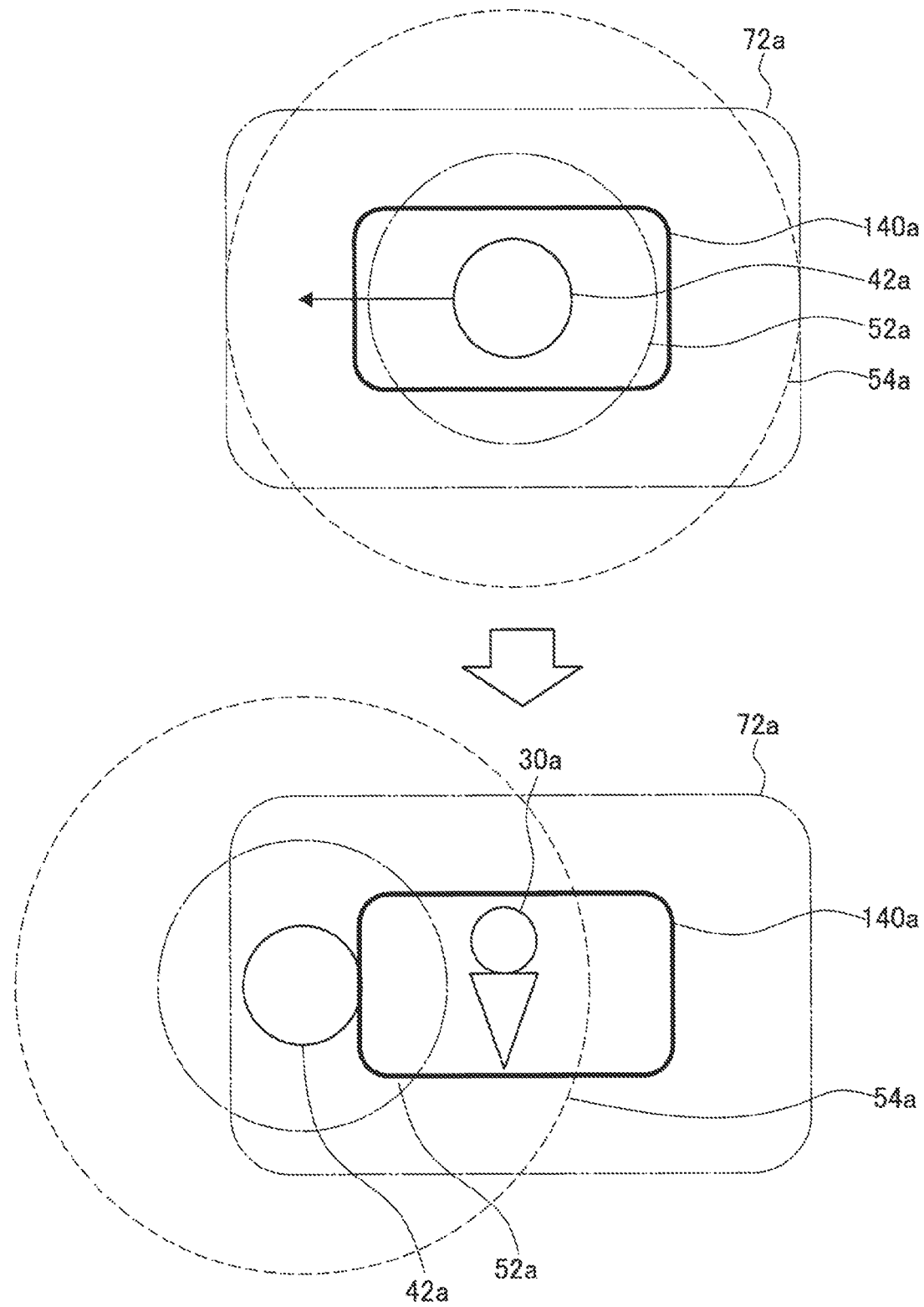
FIG. 19 is a diagram illustrating a display example of the avatar on the display unit in a case where the visual line is moved within the visual line detection area when the avatar according to the same embodiment is not displayed.

FIG. 19 is a diagram illustrating a display example of the avatar on the display unit in a case where the visual line is moved within the visual line detection area when the avatar according to the present embodiment is not displayed. In an upper diagram of FIG. 19, the gaze area 42a of the user 20a is located in the visual line detection area 72a larger than the display unit 140a. Around the gaze area 42a, the central visual field 52a and the peripheral visual field 54a of the user 20a are present as illustrated in the upper diagram of FIG. 19. Then, there is no sufficient area for displaying the avatar 30a inside the display unit 140, outside the gaze area 42a, outside the central visual field 52a, and inside the peripheral visual field 54a, and thus the avatar 30a is not displayed.

It is assumed that the user 20a has moved in the gaze area 42a from the state in the upper diagram in FIG. 19 described above in the direction of an arrow illustrated in the upper diagram in FIG. 19 to a position in the visual line detection area 72a, and has transitioned to a state illustrated in the lower diagram in FIG. 19. At this time, there is an area where the avatar 30a can be displayed inside the display unit 140, outside the gaze area 42a, outside the central visual field 52a, and inside the peripheral visual field 54a, and thus the avatar 30a is displayed as illustrated in the lower diagram of FIG. 19.

Figure 20:
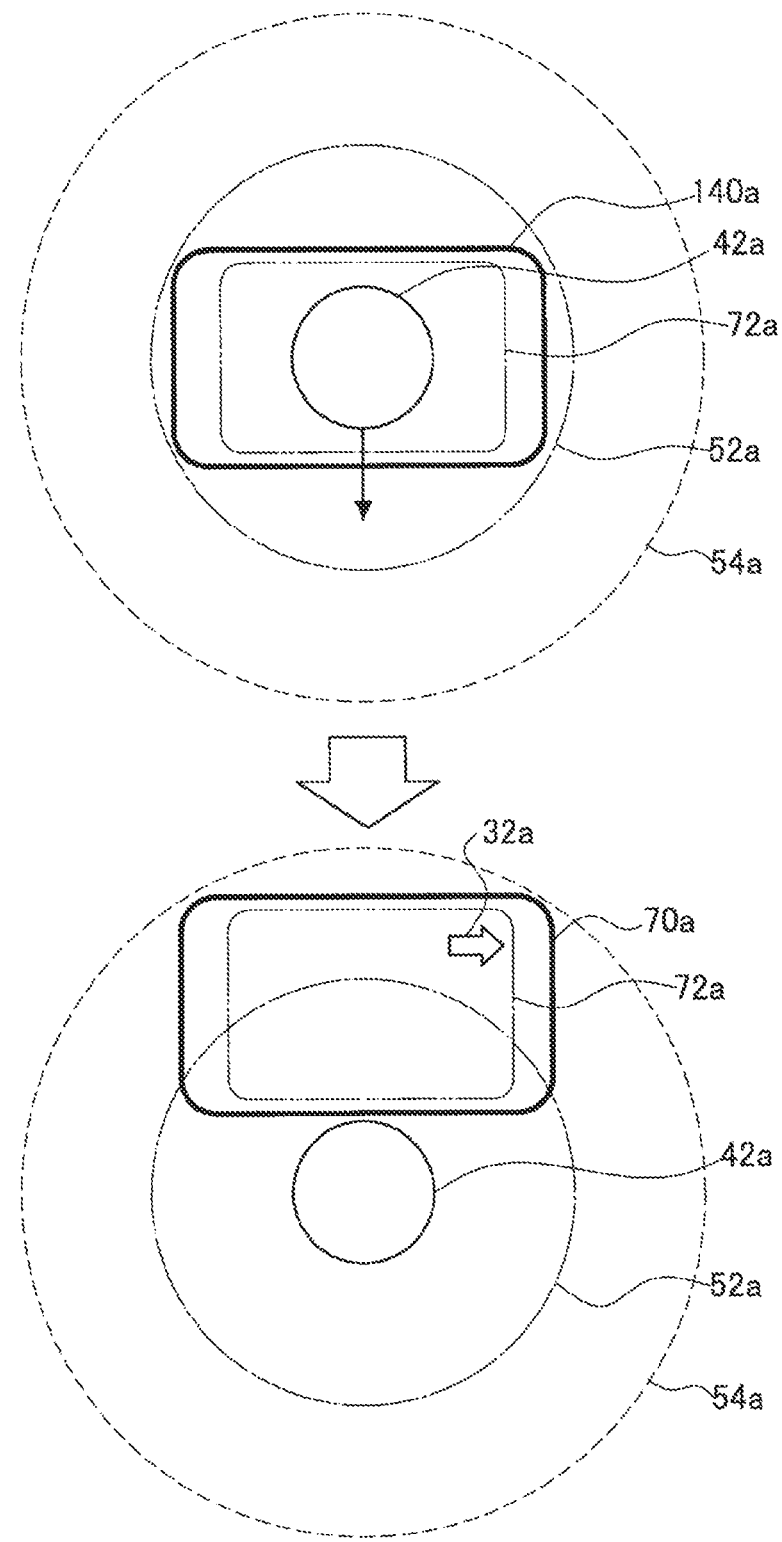
FIG. 20 is a diagram illustrating a display example of the avatar on the display unit in a case where the visual line is moved to the outside of the visual line detection area when the avatar according to the same embodiment is not displayed.

FIG. 20 is a diagram illustrating a display example of the avatar on the display unit in a case where the visual line is moved to the outside of the visual line detection area when the avatar according to the present embodiment is not displayed. In an upper diagram of FIG. 20, the gaze area 42a of the user 20a is located in the visual line detection area 72a smaller than the display unit 140a. Around the gaze area 42a, the central visual field 52a and the peripheral visual field 54a of the user 20a are present as illustrated in the upper diagram of FIG. 20. Then, areas inside the display unit 140, outside the gaze area 42a, outside the central visual field 52a, and inside the peripheral visual field 54a are areas outside the display unit 140, and thus the avatar 30a is not displayed on the display unit 140.

It is assumed that the user 20a has moved the gaze area 42a from the state in the upper diagram of FIG. 20 described above in the direction of an arrow illustrated in the upper diagram of FIG. 20 to a position outside the visual line detection area 72a, and has transitioned to a state illustrated in a lower diagram of FIG. 20. At this time, since the gaze area 42a has moved to the outside of the visual line detection area 72a, the control unit 120 estimates the position of the gaze area 42a after movement on the basis of movement of the gaze area 42a immediately before the gaze area 42a moves to the outside of the visual line detection area 72a, as in the example illustrated in FIG. 18.

For example, in a case where it is estimated that the position of the gaze area 42a after movement has moved to a position illustrated in the lower diagram of FIG. 20, the positions of the central visual field 52a and the peripheral visual field 54a are also estimated as illustrated in the lower diagram of FIG. 20. At this time, although areas inside the display unit 140, outside the gaze area 42a, outside the central visual field 52a, and inside the peripheral visual field 54a are in the display unit 140, there is no sufficient area for displaying the avatar 30a, and thus the avatar 30a is not displayed. However, there is an area for displaying an object 32a indicating the position of the avatar 30a, and thus the object 32a is displayed as illustrated in the lower diagram of FIG. 20.

<1-5. Flow of Processing in Information Processing Terminal>

The display example of the avatar 30 on the display unit 140 according to the present embodiment has been described above. Next, a flow of processing in the information processing terminal 10 according to the present embodiment will be described. In the information processing terminal 10 according to the present embodiment, for example, a flow of processing can be divided depending on which avatar 30 is used by the user 20.

(1) Case where Each User 20 Uses their Own Avatar 30

Figure 21:
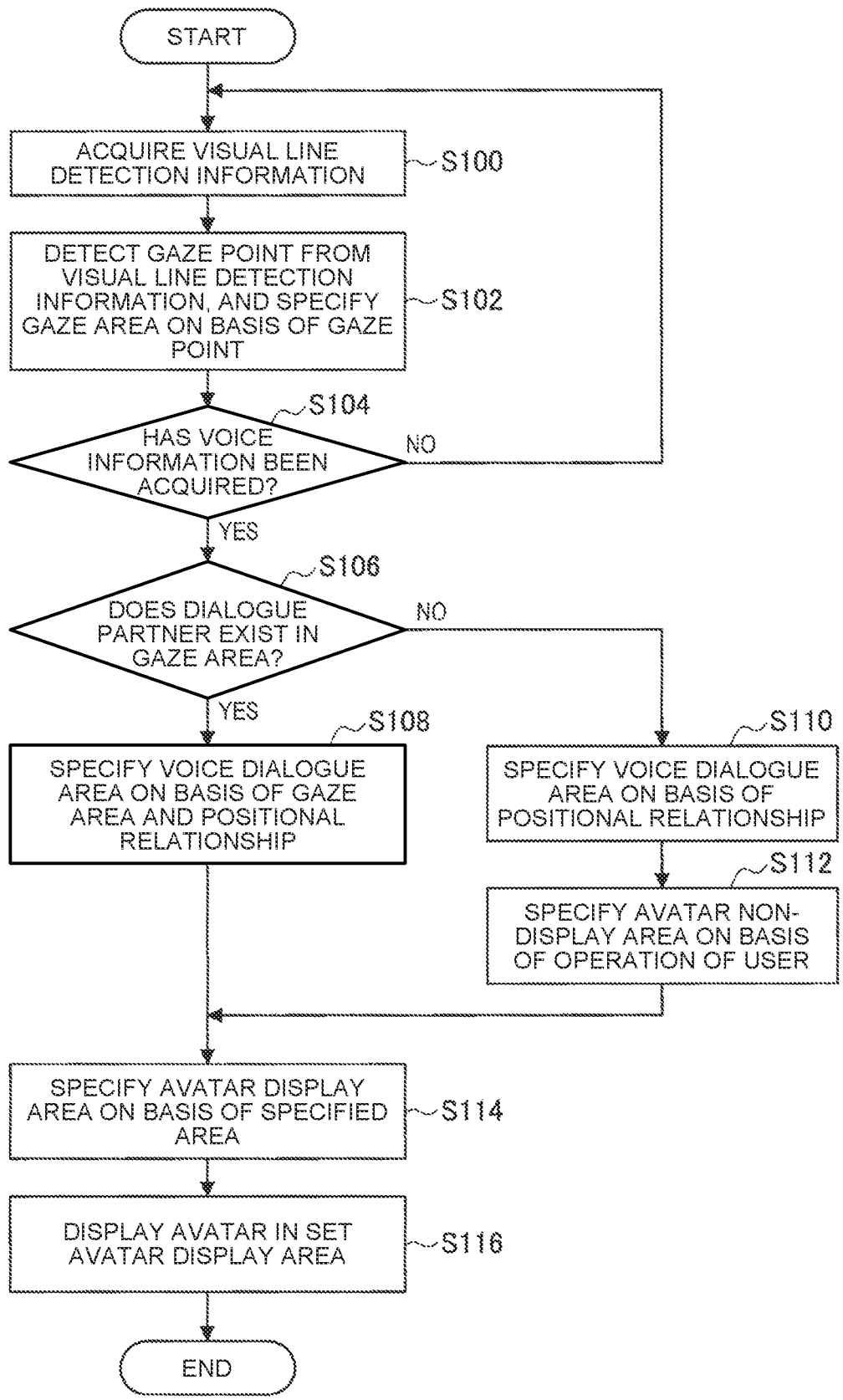
FIG. 21 is a flowchart illustrating a flow of processing in a case where an own avatar according to the same embodiment is used.

First, a flow of processing in a case where the user 20 uses his or her avatar 30 will be described. FIG. 21 is a flowchart illustrating a flow of processing in a case where each user uses his or her own avatar according to the embodiment of the present disclosure. Hereinafter, specifically, a flow of processing performed by the information processing terminal 10a in a case where the user 20a uses the avatar 30a will be described.

First, the information processing terminal 10a acquires the visual line detection information of the user 20a (S100). The information processing terminal 10a detects the gaze point 41a of the user 20a from the acquired visual line detection information, and specifies the gaze area 42a of user 20a based on the gaze point 41a (S102). Next, the information processing terminal 10a checks whether or not the voice information has been acquired (S104). In a case where the voice information has been acquired (S104/YES), the information processing terminal 10a further checks whether or not the user 20b is in the gaze area 42a (S106). In a case where the user 20b is in the gaze area 42a (S106/YES), the information processing terminal 10a specifies the voice dialogue area 40a on the basis of the gaze area 42a and the positional relationship (S108).

On the other hand, when the user 20b is not in the gaze area 42 (S106/NO), the information processing terminal 10a specifies the voice dialogue area 40a on the basis of the positional relationship (S110). Next, the information processing terminal 10a specifies the avatar non-display area on the basis of an operation of the user 20a (S112).

The information processing terminal 10a specifies the avatar display area 50a on the basis of the specified area (S114). Then, the information processing terminal 10a displays the avatar 30a in the set avatar display area 50a (S116), and ends the processing.

(2) Case where Each User 20 Uses Common Avatar 30c

Figure 22:
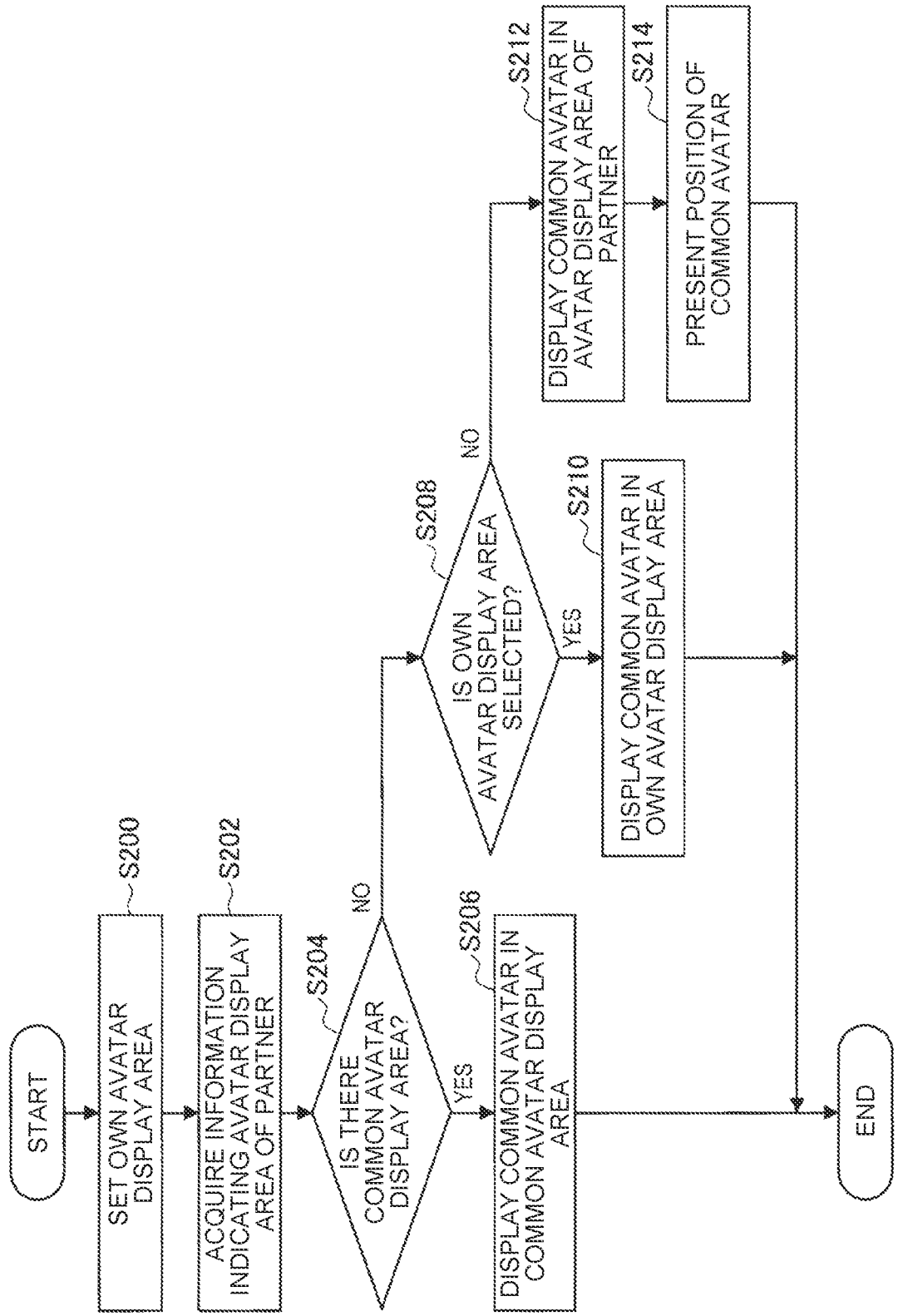
FIG. 22 is a flowchart illustrating a flow of processing in a case where the common avatar according to the same embodiment is used.

Next, a flow of processing in a case where each user 20 uses the common avatar 30c will be described. FIG. 22 is a flowchart illustrating a flow of processing in a case where each user uses the common avatar according to an embodiment of the present disclosure. Hereinafter, specifically, a flow of processing performed by the information processing terminal 10a in a case where the user 20a and the user 20b use the common avatar 30c will be described.

First, the information processing terminal 10a sets the avatar display area 50a of the avatar 30a of the user 20a (S200). Next, the information processing terminal 10a acquires information indicating the avatar display area 50b of the avatar 30b of the user 20b (S202).

After the acquisition, the information processing terminal 10a checks whether or not there is an area common to the avatar display area 50a and the avatar display area 50b (S204). In a case where there is a common area (S204/YES), the information processing terminal 10a displays the common avatar 30c in the common avatar display area (S206), and ends the processing.

In a case where there is no common area (S204/NO), the information processing terminal 10a checks whether or not to select the avatar display area 50a of the user 20a (S208). In a case where the avatar display area 50a of the user 20a is selected (S208/YES), the information processing terminal 10a displays the common avatar 30c in the avatar display area 50a of the user 20a (S210), and ends the processing.

In a case where the avatar display area 50a of the user 20a is not selected (S208/NO), the information processing terminal 10a displays the common avatar 30c in the avatar display area 50b of the user 20b (S212). Next, the information processing terminal 10a presents the position of the avatar 30c common to the user 20a (S214), and ends the processing.

(3) Case where Users 20 can Use Avatars 30 of Each Other

Figure 23:
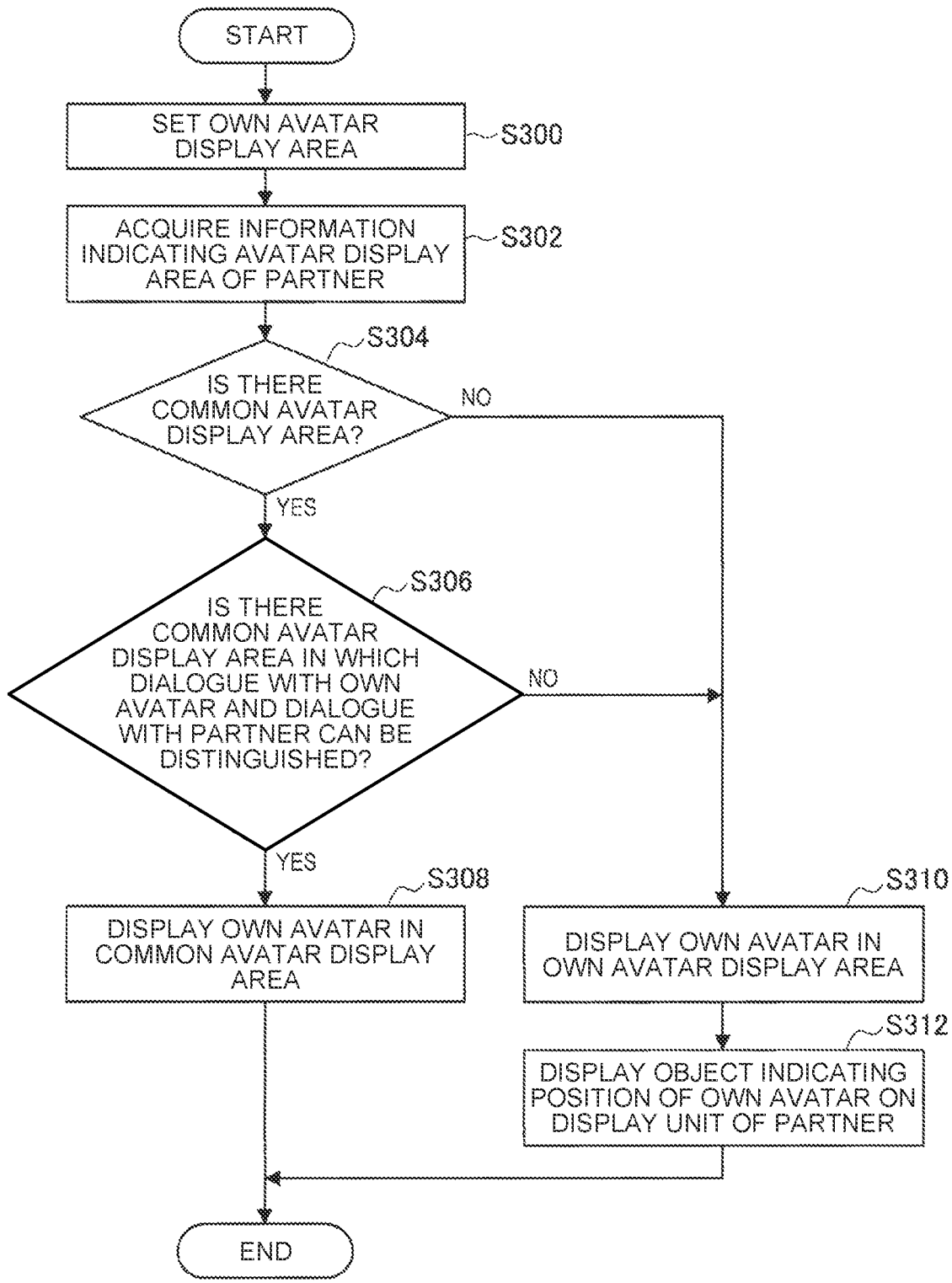
FIG. 23 is a flowchart illustrating a flow of processing in a case where avatars of each other can be used according to the same embodiment.

Finally, a flow of processing in a case where the users 20 can use the avatars 30 of each other will be described. FIG. 23 is a flowchart illustrating a flow of processing in a case where the users can use the avatars of each other according to the embodiment of the present disclosure. Hereinafter, specifically, a flow of processing will be described that is performed by the information processing terminal 10a in a case where the user 20a has the avatar 30a and the user has the avatar 30b, and the avatars 30 of each other can be used.

First, the information processing terminal 10a sets the avatar display area 50a of the user 20a (S300). Next, the information processing terminal 10a acquires information indicating the avatar display area 50b of the avatar 30b of the user 20b (S302).

After the acquisition, the information processing terminal 10a checks whether or not there is an avatar display area common to the avatar display area 50a and the avatar display area 50b (S304). In a case where there is a common avatar display area (S304/YES), the information processing terminal 10a further checks whether or not there is a common avatar display area in which it is possible to distinguish whether or not it is a dialogue of the user 20a with the avatar 30a or an utterance to the user 20b (S306).

In a case where there is a common avatar display area in which the utterance target can be distinguished (S306/YES), the information processing terminal 10 displays the avatar 30a of the user 20a in the common avatar display area (S308). In a case where there is a common avatar display area in which the utterance target can be distinguished (S306/YES), the information processing terminal 10 displays the avatar 30a of the user 20a in the common avatar display area (S308).

In a case where there is no common avatar display area (S304/NO), or in a case where there is no common avatar display area in which the utterance target can be distinguished (S306/NO), the information processing terminal 10 displays the avatar 30a of the user 20a in the avatar display area 50a of the user 20a (S310). Next, the information processing terminal 10a transmits information indicating the position of the avatar 30a of the user 20a to the information processing terminal 10b of the user 20b and causes display of the information (S312), and ends the processing.

2. Second Embodiment

The first embodiment of the present disclosure has been described above. Next, a second embodiment of the present disclosure will be described. In the first embodiment described above, an example in which the information processing terminal 10 is achieved by the HMD has been described. In the second embodiment, an example in which the information processing terminal 10 is achieved by a device capable of presenting a virtual object in a real space will be described. Note that in the second embodiment described below, only differences from the above-described first embodiment will be described.

<2-1. Overview>

Figure 24:
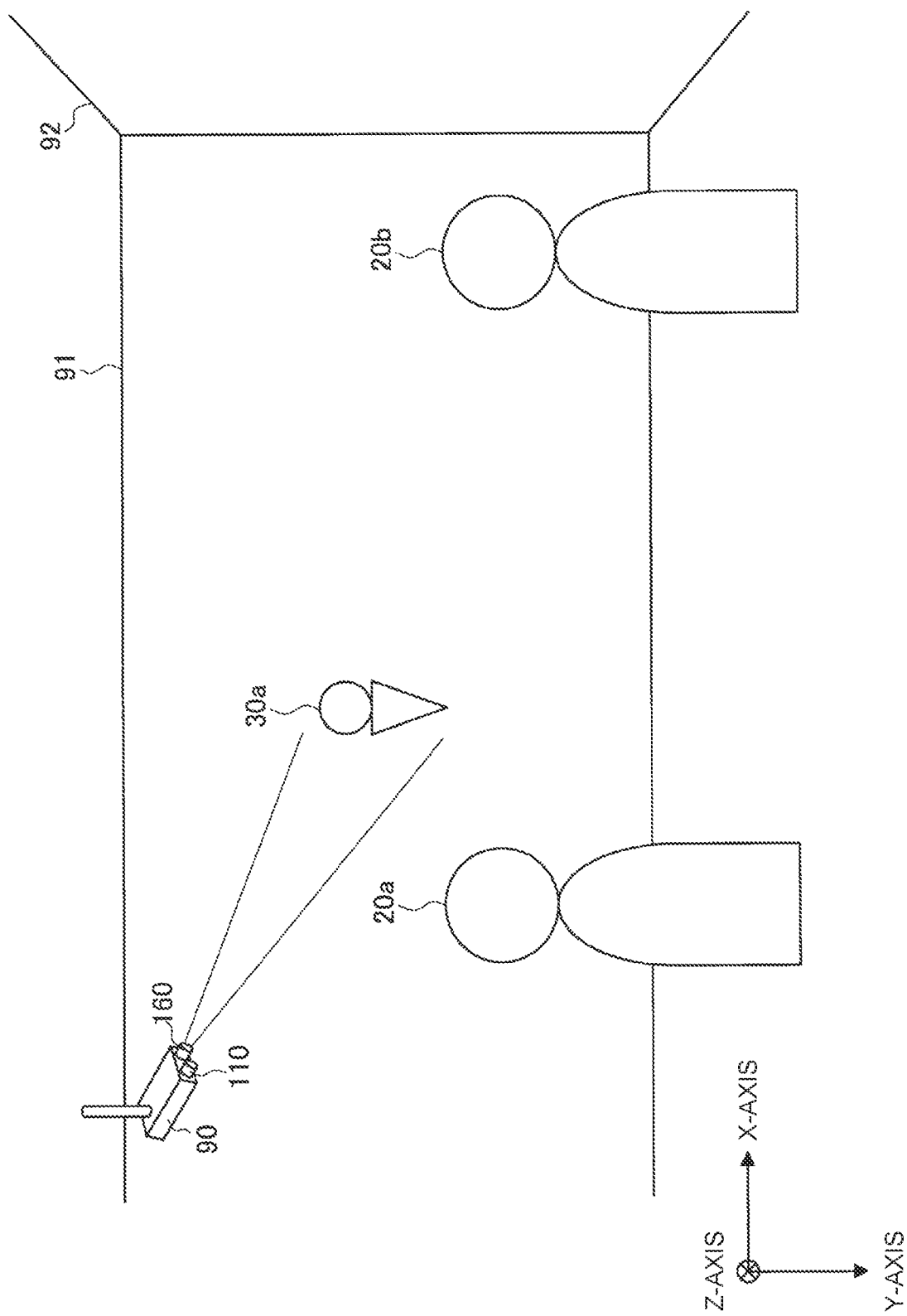
FIG. 24 is a diagram illustrating an outline of an information processing system according to a second embodiment of the present disclosure.

First, an outline of an information processing system according to the second embodiment of the present disclosure will be described. FIG. 24 is a diagram illustrating an outline of the information processing system according to the second embodiment of the present disclosure. The information processing system according to the second embodiment presents a virtual object 30 to a user 20 by projecting a virtual object 30 onto a wall surface 91, a wall surface 92, or the like by an information processing terminal 90 provided on a ceiling. The wall surface 91, the wall surface 92, and the floor are examples of projection surfaces on which information is projected.

For example, as illustrated in FIG. 24, a user 20a and a user 20b do not particularly need to wear a terminal, unlike the first embodiment. In a case where the user 20a has an avatar 30a, the avatar 30a is displayed (that is, projected) on the wall surface 91, the wall surface 92, or the like in the real space by an output unit 160 of the information processing terminal 90. At this time, the information processing terminal 90 acquires information necessary for setting the position of the avatar 30a by the acquisition unit 110. Then, the information processing terminal 90 sets the position of the avatar 30a on the basis of the information acquired by the acquisition unit 110, and displays the avatar 30a by the output unit 160 at the set position. For example, as illustrated in FIG. 24, the avatar 30a is presented by the output unit 160 on the wall surface 91 in the real space. The information necessary for setting the position is position information, visual line detection information, and voice information of the user 20a, and position information of the user 20b.

<2-2. Configuration of Information Processing Terminal>

Figure 25:
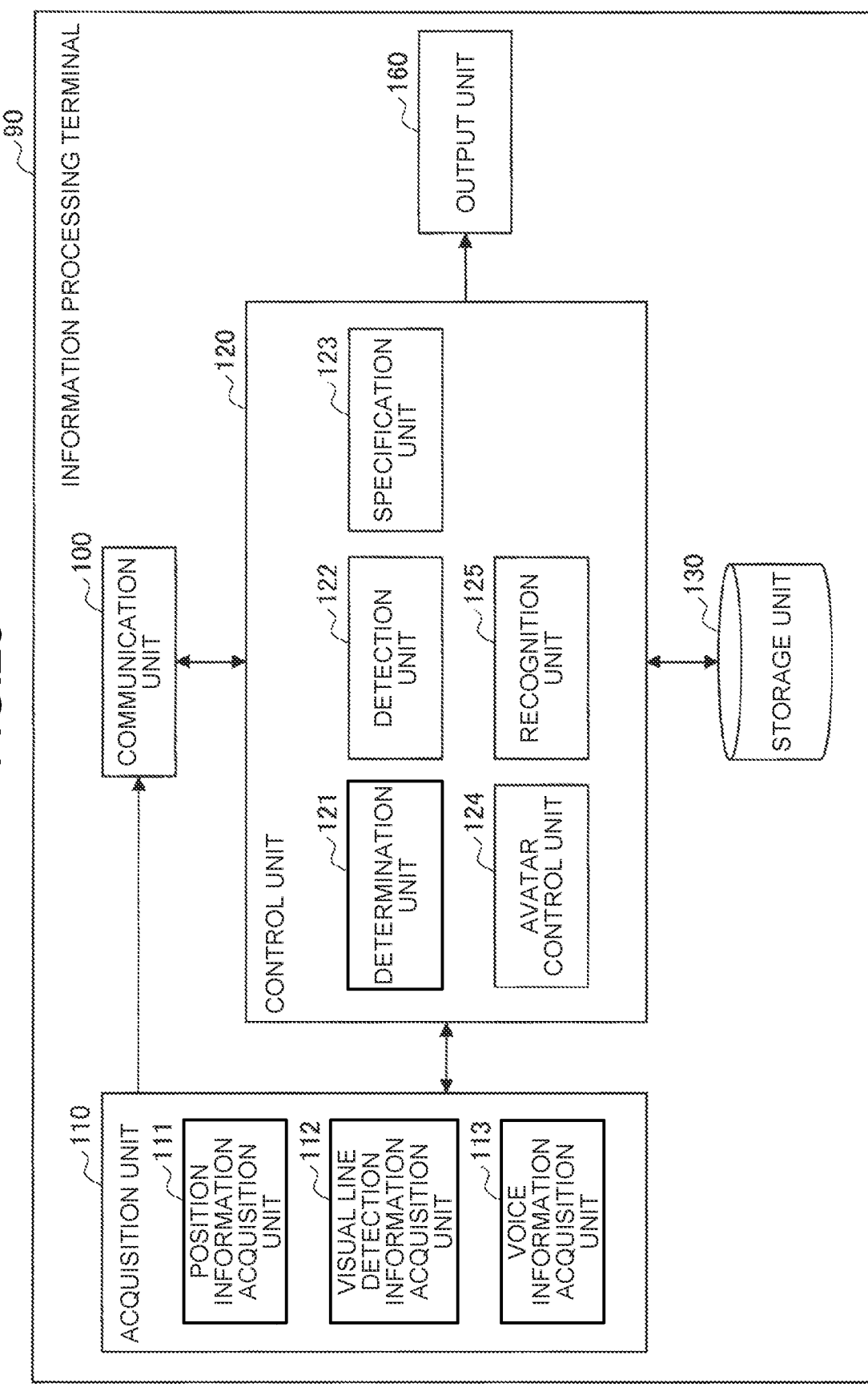
FIG. 25 is a block diagram illustrating a configuration example of an information processing terminal according to the same embodiment.

Next, a configuration of the information processing terminal 90 according to the second embodiment will be described. FIG. 25 is a block diagram illustrating a configuration example of the information processing terminal 90 according to the present embodiment. The information processing terminal 90 according to the second embodiment is different in that the output unit 160 is included instead of the display unit 140 and the voice output unit 150, as compared to the information processing terminal 10 according to the first embodiment. Note that functions other than the output unit 160 in the information processing terminal 90 are the same as the functions in the information processing terminal 10, and thus the description thereof will be omitted.

(1) Output Unit 160

The output unit 160 is a device that displays a virtual object in a real space. The output unit 160 displays the virtual object in the real space in accordance with an instruction input from the control unit 120. For example, the output unit 160 displays the avatar 30a of the user 20a at the position of the avatar 30 set by the avatar control unit 124 in a similar manner to the first embodiment on the basis of the information acquired by the acquisition unit 110. For example, a projector is used as the output unit 160. In the example illustrated in FIG. 24, the output unit 160 is disposed, for example, in a state of being suspended from the ceiling.

<2-3. Display Position of Voice Dialogue Area and Avatar>

The configuration of the information processing terminal 90 has been described above. Next, a voice dialogue area and a display position of the avatar will be described. The information processing terminal 90 according to the present embodiment specifies a voice dialogue area 40a and sets the position of the avatar 30a on the basis of the visual line of the user 20a or the direction of the face of the user 20a. Hereinafter, a situation in which the user 20a and the user 20b face each other and have a dialogue in a stationary state will be described as an example.

Figure 26:
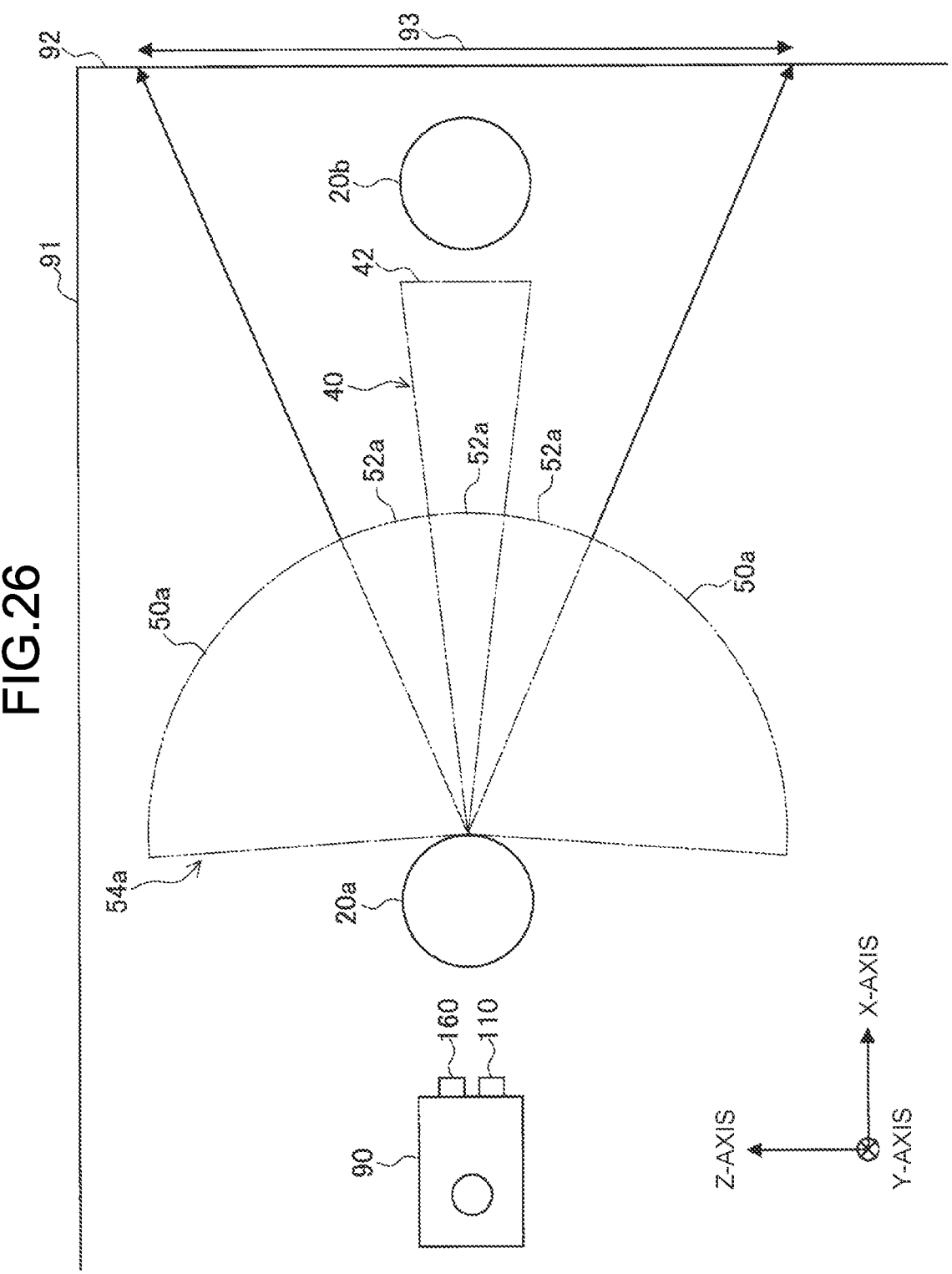
FIG. 26 is a diagram illustrating the voice dialogue area and an avatar display area based on a visual line according to the same embodiment.

FIG. 26 is a diagram illustrating the voice dialogue area and an avatar display area based on a visual line according to the present embodiment. Note that the method by which the information processing terminal 90 specifies a voice dialogue area 40a is the same as that of the information processing terminal 10, and thus the description thereof will be omitted.

In the second embodiment, a method of setting the position of the avatar 30a after specifying the voice dialogue area 40a based on either the visual line or the face direction of the user 20a is partially different from that in the first embodiment. For example, in a case where the avatar 30a is displayed on the wall surface 91, the wall surface 92, or the like in the real space instead of the avatar display area 50a, the information processing terminal 90 considers the positional relationship between the user 20b and the projection surface. For example, the range of an arrow 93 on the wall surface 92 illustrated in FIG. 26 is the range of the wall surface 92 that can enter a central visual field of the user 20a when the central visual field 52a of the user 20a is extended to the position of the wall surface 92. Thus, when the avatar 30a is displayed in the range of the arrow 93, it may be difficult to distinguish which of the user 20b and the avatar 30a the utterance of the user 20a is for.

Accordingly, for example, the information processing terminal 90 controls display processing of the avatar 30a so as not to display the avatar 30a on the wall surface existing in the direction of the central visual field of the user 20a. In this manner, the information processing terminal 90 can suppress the display of the avatar 30a at a position where it may be difficult to distinguish which of the user 20b and the avatar 30a the utterance of the user 20a is for.

3. Hardware Configuration Example

Figure 27:
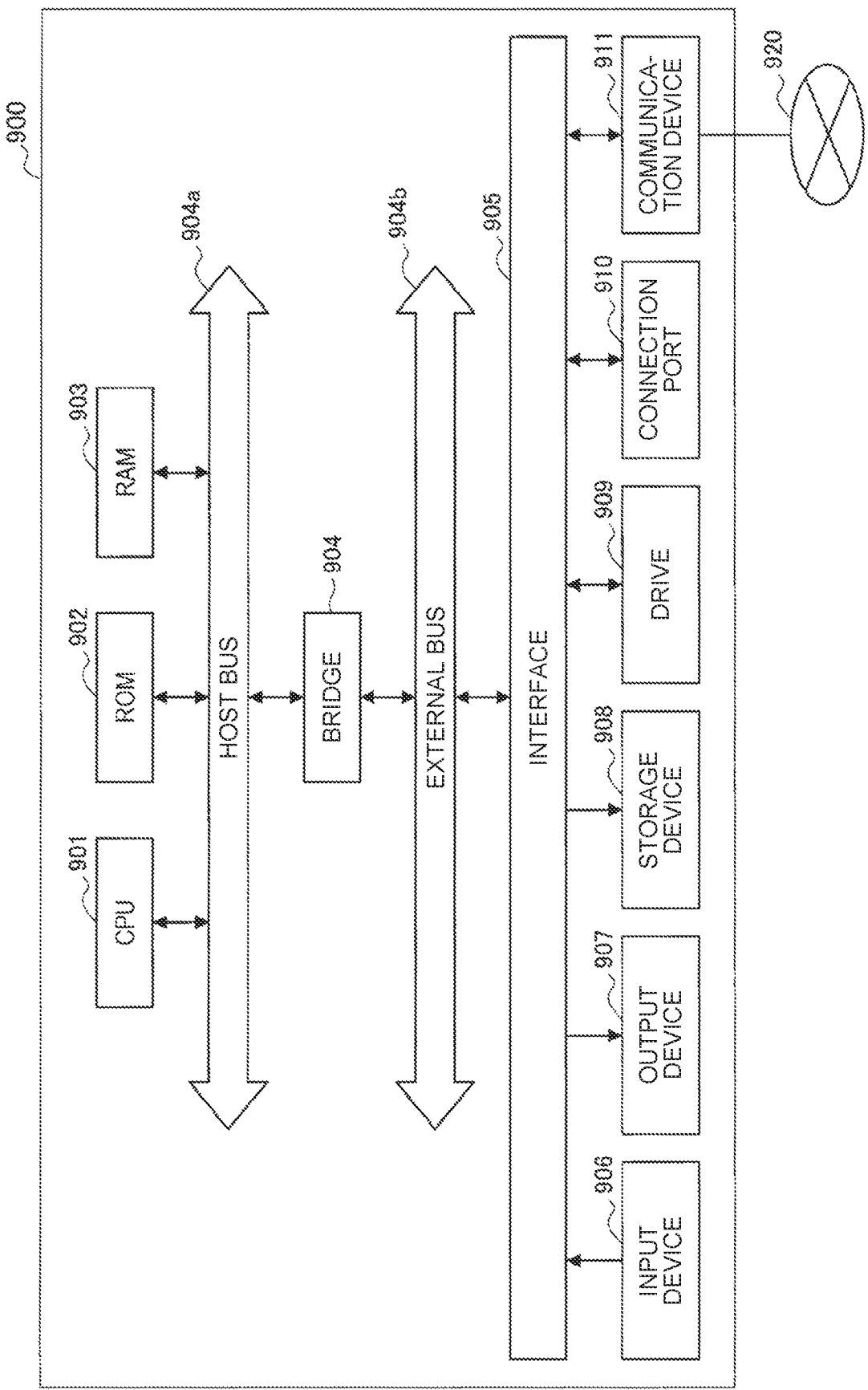
FIG. 27 is a block diagram illustrating a hardware configuration example of an information processing device according to an embodiment of the present disclosure.

Finally, a hardware configuration example of the information processing device according to the present embodiment will be described with reference to FIG. 27. FIG. 27 is a block diagram illustrating the hardware configuration example of the information processing device according to the present embodiment. Note that an information processing device 900 illustrated in FIG. 27 can achieve the information processing terminal 10 illustrated in FIG. 2, for example. Information processing by the information processing terminal 10 according to the present embodiment is achieved by cooperation of software and hardware described below.

As illustrated in FIG. 27, the information processing device 900 includes a central processing unit (CPU) 901, a read only memory (ROM) 902, and a random access memory (RAM) 903. Further, the information processing device 900 includes a host bus 904a, a bridge 904, an external bus 904b, an interface 905, an input device 906, an output device 907, a storage device 908, a drive 909, a connection port 910, and a communication device 911. Note that the hardware configuration illustrated here is an example, and some of the components may be omitted. Further, the hardware configuration may further include components other than the components illustrated here.

The CPU 901 functions as, for example, an arithmetic processing device or a control device, and controls the overall operation of each component or a part thereof on the basis of various programs recorded in the ROM 902, the RAM 903, or the storage device 908. The ROM 902 is a means for storing a program read by the CPU 901, data used for calculation, and the like. The RAM 903 temporarily or permanently stores, for example, a program read by the CPU 901, various parameters that appropriately change when the program is executed, and the like. These components are mutually connected by a host bus 904a including a CPU bus or the like. The CPU 901, the ROM 903, and the RAM 905 can achieve the functions of the control unit 120 described with reference to FIGS. 2 and 25, for example, in cooperation with software.

The CPU 901, the ROM 902, and the RAM 903 are mutually connected via, for example, the host bus 904a capable of high-speed data transmission. On the other hand, the host bus 904a is connected to the external bus 904b having a relatively low data transmission speed via the bridge 904, for example. Further, the external bus 904b is connected to various components via the interface 905.

The input device 906 is achieved by, for example, a device to which information is input by the user, such as a mouse, a keyboard, a touch panel, a button, a microphone, a switch, and a lever. Further, the input device 906 may be, for example, a remote control device using infrared rays or other radio waves, or may be an external connection device such as a mobile phone or a PDA corresponding to the operation of the information processing device 900. Moreover, the input device 906 may include, for example, an input control circuit or the like that generates an input signal on the basis of information input by the user using the aforementioned input means and outputs the input signal to the CPU 901. By operating the input device 906, the user of the information processing device 900 can input various data and give an instruction on a processing operation to the information processing device 900.

In addition, the input device 906 can be formed by a device that detects information regarding the user. For example, the input device 906 may include various sensors such as an image sensor (for example, a camera), a depth sensor (for example, a stereo camera), an acceleration sensor, a gyro sensor, a geomagnetic sensor, an optical sensor, a sound sensor, a distance measurement sensor (for example, a time of flight (ToF) sensor), and a force sensor. Further, the input device 906 may acquire information regarding the state of the information processing device 900 itself, such as the attitude and moving speed of the information processing device 900, and information regarding the surrounding environment of the information processing device 900, such as brightness and noise around the information processing device 900. Further, the input device 906 may include a global navigation satellite system (GNSS) module that receives a GNSS signal (for example, a global positioning system (GPS) signal from a GPS satellite) from a GNSS satellite and measures position information including the latitude, longitude, and altitude of the device. Further, regarding the position information, the input device 906 may detect the position by transmission and reception with Wi-Fi (registered trademark), a mobile phone, a PHS, a smartphone, or the like, near field communication, or the like. The input device 906 can achieve, for example, the function of the acquisition unit 110 described with reference to FIGS. 2 and 25.

The output device 907 is formed of a device capable of visually or aurally notifying the user of the acquired information. Examples of such a device include a display device such as a CRT display device, a liquid crystal display device, a plasma display device, an EL display device, a laser projector, an LED projector, and a lamp, a voice output device such as a speaker and a headphone, and a printer device, and the like. The output device 907 outputs, for example, results obtained by various types of processing performed by the information processing device 900. Specifically, the display device visually displays results obtained by various processes performed by the information processing device 900 in various formats such as text, images, tables, and graphs. On the other hand, the voice output device converts an audio signal including reproduced audio data, acoustic data, or the like into an analog signal and aurally outputs the analog signal. The output device 907 can implement, for example, the functions of the display unit 140 and the voice output unit 150 described with reference to FIG. 2, and the output unit 160 described with reference to FIG. 25.

The storage device 908 is a device for data storage formed as an example of a storage unit of the information processing device 900. The storage device 908 is achieved by, for example, a magnetic storage device such as an HDD, a semiconductor storage device, an optical storage device, a magneto-optical storage device, or the like. The storage device 908 may include a storage medium, a recording device that records data in the storage medium, a reading device that reads data from the storage medium, a deletion device that deletes data recorded in the storage medium, and the like. The storage device 908 stores programs executed by the CPU 901, various data, various data acquired from the outside, and the like. The storage device 908 can achieve, for example, the function of the storage unit 130 described with reference to FIGS. 2 and 25.

The drive 909 is a reader-writer for a storage medium, and is built in or externally attached to the information processing device 900. The drive 909 reads information recorded in a removable storage medium such as a mounted magnetic disk, optical disk, magneto-optical disk, or semiconductor memory, and outputs the information to the RAM 903. Further, the drive 909 can also write information to the removable storage medium.

The connection port 910 is, for example, a port for connecting an external connection device such as a universal serial bus (USB) port, an IEEE 1394 port, a small computer system interface (SCSI), an RS-232C port, or an optical audio terminal.

The communication device 911 is, for example, a communication interface formed by a communication device or the like for connecting to the network 920. The communication device 911 is, for example, a communication card for wired or wireless local area network (LAN), long term evolution (LTE), Bluetooth (registered trademark), wireless USB (WUSB), or the like. Further, the communication device 911 may be a router for optical communication, a router for asymmetric digital subscriber line (ADSL), a modem for various communications, or the like. For example, the communication device 911 can transmit and receive signals and the like to and from the Internet and other communication devices according to a predetermined protocol such as TCP/IP. The communication device 911 can achieve, for example, the function of the communication unit 100 described with reference to FIGS. 2 and 25.

Note that the network 920 is a wired or wireless transmission path of information transmitted from a device connected to the network 920. For example, the network 920 may include a public network such as the Internet, a telephone network, or a satellite communication network, various local area networks (LANs) including Ethernet (registered trademark), a wide area network (WAN), or the like. Further, the network 920 may include a dedicated line network such as an Internet protocol-virtual private network (IP-VPN).

An example of the hardware configuration capable of achieving the functions of the information processing device 900 according to the present embodiment has been described above. Each of the above-described components may be achieved using a general-purpose member, or may be achieved by hardware specialized for the function of each component. Therefore, it is possible to appropriately change the hardware configuration to be used according to the technical level at the time of carrying out the present embodiment.

4. Summary

As described above, an information processing device according to the embodiment of the present disclosure acquires position information, visual line detection information, and voice information of a user 20a, and position information of a user 20b. The information processing device determines the positional relationship between the user 20a and the user 20b on the basis of the acquired position information of the user 20a and position information of the user 20b. Then, on the basis of the determined positional relationship, a voice dialogue area 40a in which a voice dialogue between the user 20a and the user 20b can be performed is specified, and the position of an avatar 30a is set outside the specified voice dialogue area 40a. Thus, the information processing device can suppress display of the avatar 30a at a position where it can be difficult to distinguish the utterance target of the user 20a from visual line detection information.

Moreover, in a case where the voice information of the user 20a is acquired when the user 20a is looking outside the voice dialogue area 40a, the information processing device causes the avatar 30a to execute a predetermined action. On the other hand, in a case where the voice information of the user 20a is acquired when the user 20a is looking inside the voice dialogue area 40a, the information processing device suppresses the avatar 30a from executing a predetermined action. Thus, the information processing device can cause the avatar 30a to appropriately execute an action based on an instruction performed by the user 20a on the avatar 30a.

Therefore, it is possible to provide a new and improved information processing device, information processing method, and recording medium capable of suppressing a malfunction of an avatar.

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various change examples or modification examples within the scope of the technical idea described in the claims, and it is naturally understood that these also belong to the technical scope of the present disclosure.

For example, each device described in the present description may be achieved as a single device, or some or all of the devices may be achieved as separate devices. For example, at least one of the acquisition unit 110 or the control unit 120 included in the information processing terminal 10 illustrated in FIG. 2 may be achieved as a single device. For example, the acquisition unit 110 may be achieved as an independent device such as a sensor device, and may be connected to the information processing terminal 10 via a network or the like. Further, the control unit 120 may be achieved as an independent device such as a server device, and may be connected to the information processing terminal 10 via a network or the like.

Further, the series of processing by each device described in the present description may be achieved using any of software, hardware, and a combination of software and hardware. The program constituting the software is stored in advance in, for example, a recording medium (non-transitory medium) provided inside or outside each device. Then, each program is read into the RAM at the time of execution by the computer, for example, and is executed by a processor such as a CPU.

Further, the processing described using the flowcharts in the present description may not necessarily be executed in the illustrated order. Some processing steps may be performed in parallel. Further, additional processing steps may be employed, and some processing steps may be omitted.

Further, the effects described in the present description are merely illustrative or exemplary, and are not restrictive. That is, the technology according to the present disclosure can exhibit other effects obvious to those skilled in the art from the description of the present description together with or instead of the above effects.

Note that configurations as follows also belong to the technical scope of the present disclosure.

(1)

An information processing device comprising:
an acquisition unit that acquires position information, visual line detection information, and voice information of a first user, and position information of a second user;
a determination unit that determines a positional relationship between the first user and the second user on a basis of the position information of the first user and the position information of the second user;
a specification unit that specifies a voice dialogue area in which a voice dialogue is possible to be performed between the first user and the second user on a basis of the determined positional relationship; and
an avatar control unit that sets a position of an avatar outside the specified voice dialogue area,
wherein in a case where the voice information of the first user is acquired when the first user is looking outside the voice dialogue area, the avatar control unit causes the avatar to execute a predetermined action, and
in a case where the voice information of the first user is acquired when the first user is looking inside the voice dialogue area, the avatar control unit suppresses the avatar from executing the predetermined action.

(2)

The information processing device according to (1), further comprising a detection unit that detects visual line direction information and a peripheral visual field of the first user,
wherein the specification unit specifies the voice dialogue area on a basis of the visual line direction information of the first user when the first user is having a dialogue with the second user.

(3)

The information processing device according to (2), wherein
the detection unit detects gaze points of the first user as the visual line direction information on a basis of the visual line detection information, and
the specification unit specifies a gaze area that is an area in which the gaze points of the first user are distributed, and specifies the voice dialogue area on a basis of the gaze area and the positional relationship.

(4)

The information processing device according to (3), wherein
in a case where the voice dialogue area is specified on a basis of the gaze points of the first user, the detection unit further detects a central visual field of the first user, and the avatar control unit sets the position of the avatar at a position outside the voice dialogue area, outside the central visual field of the first user, and inside the peripheral visual field of the first user.

(5)

The information processing device according to (2), wherein the detection unit detects a direction of a face of the first user as the visual line direction information on a basis of inertia information of the first user acquired as the visual line detection information, and the specification unit specifies the voice dialogue area on a basis of the direction of the face of the first user.

(6)

The information processing device according to (5), wherein in a case where the voice dialogue area is identified based on the direction of the face of the first user, the specification unit further specifies a visual line movement area that is an area in which the first user is able to move a visual line, and the avatar control unit sets the position of the avatar at a position outside the voice dialogue area, outside the visual line movement area, and inside the peripheral visual field of the first user.

(7)

The information processing device according to any one of (2) to (6), wherein in a case where the first user and the second user use a common avatar, the avatar control unit sets a position of the common avatar in a common space between the peripheral visual field of the first user and the peripheral visual field of the second user.

(8)

The information processing device according to any one of (2) to (6), wherein in a case where the first user and the second user use a common avatar, the avatar control unit selects either the peripheral visual field of the first user or the peripheral visual field of the second user, and sets the position of the common avatar in the selected peripheral visual field.

(9)

The information processing device according to any one of (1) to (8), wherein the specification unit specifies in advance an area in which it is estimated that the voice dialogue is possible to be performed between the first user and the second user as the voice dialogue area.

(10)

The information processing device according to any one of (2) to (9), wherein in a case where the first user is having a dialogue with the second user without looking at the second user, the specification unit specifies a space between the first user and the second user as the voice dialogue area on a basis of the positional relationship.

(11)

The information processing device according to (10), wherein in a case where the first user and the second user are moving side by side in parallel, the avatar control unit sets the position of the avatar at a position outside a space in a moving direction of the first user and the second user.

(12)

The information processing device according to (10), wherein in a case where the first user is working, the avatar control unit sets the position of the avatar at a position outside a work area that is an area where the first user performs work.

(13)

The information processing device according to any one of (1) to (12), wherein the avatar control unit causes a position of the avatar to be presented by displaying an object or outputting a voice.

(14)

The information processing device according to any one of (1) to (13), further comprising a recognition unit that performs voice recognition on a basis of the voice information, wherein the predetermined action is an action determined on a basis of a result of the voice recognition by the recognition unit.

(15)

The information processing device according to any one of (1) to (14), wherein the acquisition unit includes a microphone that acquires the voice information of the first user and the second user, and acquires the position information of the second user on a basis of the voice information acquired by the microphone.

(16)

The information processing device according to any one of (1) to (15), wherein the acquisition unit includes an imaging device capable of imaging a periphery of the first user, and acquires the position information of the second user on a basis of an image captured by the imaging device.

(17)

The information processing device according to any one of (1) to (16), further comprising a communication unit, wherein the avatar control unit acquires information regarding a position where it is possible to display the avatar for the second user from an external device via communication by the communication unit.

(18)

The information processing device according to any one of (1) to (17), further comprising a display unit, wherein the display unit displays the avatar at the position set by the avatar control unit.

(19)

An information processing method comprising:

acquiring position information, visual line detection information, and voice information of a first user, and position information of a second user;

determining a positional relationship between the first user and the second user on a basis of the position information of the first user and the position information of the second user; and specifying a voice dialogue area in which a voice dialogue is possible to be performed between the first user and the second user on a basis of the determined positional relationship; and setting a position of an avatar outside the specified voice dialogue area, wherein in a case where the voice information of the first user is acquired when the first user is looking outside the voice dialogue area, the setting causes the avatar to execute a predetermined action, and in a case where the voice information of the first user is acquired when the first user is looking inside the voice dialogue area, the setting suppresses the avatar from executing the predetermined action.

(20) A recording medium recording a program causing a computer to function as:
an acquisition unit that acquires position information, visual line detection information, and voice information of a first user, and position information of a second user;
a determination unit that determines a positional relationship between the first user and the second user on a basis of the position information of the first user and the position information of the second user;
a specification unit that specifies a voice dialogue area in which a voice dialogue is possible to be performed between the first user and the second user on a basis of the determined positional relationship; and
an avatar control unit that sets a position of an avatar outside the specified voice dialogue area,
wherein in a case where the voice information of the first user is acquired when the first user is looking outside the voice dialogue area, the avatar control unit causes the avatar to execute a predetermined action, and
in a case where the voice information of the first user is acquired when the first user is looking inside the voice dialogue area, the avatar control unit suppresses the avatar from executing the predetermined action.

REFERENCE SIGNS LIST

10 INFORMATION PROCESSING TERMINAL
20 USER
30 AVATAR
90 INFORMATION PROCESSING TERMINAL
100 COMMUNICATION UNIT
110 ACQUISITION UNIT
111 POSITION INFORMATION ACQUISITION UNIT
112 VISUAL LINE DETECTION INFORMATION ACQUISITION UNIT
113 VOICE INFORMATION ACQUISITION UNIT
120 CONTROL UNIT
121 DETERMINATION UNIT
122 DETECTION UNIT
123 SPECIFICATION UNIT
124 AVATAR CONTROL UNIT
125 RECOGNITION UNIT
130 STORAGE UNIT
140 DISPLAY UNIT
150 VOICE OUTPUT UNIT
160 OUTPUT UNIT

The invention claimed is:

1. An information processing device comprising:
an acquisition unit that acquires position information, visual line detection information, and voice information of a first user, and position information of a second user;
a determination unit that determines a positional relationship between the first user and the second user on a basis of the position information of the first user and the position information of the second user;
a specification unit that specifies a voice dialogue area in which a voice dialogue is possible to be performed between the first user and the second user on a basis of the determined positional relationship; and
an avatar control unit that sets a position of an avatar outside the specified voice dialogue area,
wherein in a case where the voice information of the first user is acquired when the first user is looking outside the voice dialogue area, the avatar control unit causes the avatar to execute a predetermined action, and
in a case where the voice information of the first user is acquired when the first user is looking inside the voice dialogue area, the avatar control unit suppresses the avatar from executing the predetermined action.

2. The information processing device according to claim 1, further comprising a detection unit that detects visual line direction information and a peripheral visual field of the first user,
wherein the specification unit specifies the voice dialogue area on a basis of the visual line direction information of the first user when the first user is having a dialogue with the second user.

3. The information processing device according to claim 2, wherein
the detection unit detects gaze points of the first user as the visual line direction information on a basis of the visual line detection information, and
the specification unit specifies a gaze area that is an area in which the gaze points of the first user are distributed, and specifies the voice dialogue area on a basis of the gaze area and the positional relationship.

4. The information processing device according to claim 3, wherein
in a case where the voice dialogue area is specified on a basis of the gaze points of the first user,
the detection unit further detects a central visual field of the first user, and
the avatar control unit sets the position of the avatar at a position outside the voice dialogue area, outside the central visual field of the first user, and inside the peripheral visual field of the first user.

5. The information processing device according to claim 2, wherein
the detection unit detects a direction of a face of the first user as the visual line direction information on a basis of inertia information of the first user acquired as the visual line detection information, and
the specification unit specifies the voice dialogue area on a basis of the direction of the face of the first user.

6. The information processing device according to claim 5, wherein
in a case where the voice dialogue area is identified based on the direction of the face of the first user,
the specification unit further specifies a visual line movement area that is an area in which the first user is able to move a visual line, and
the avatar control unit sets the position of the avatar at a position outside the voice dialogue area, outside the visual line movement area, and inside the peripheral visual field of the first user.

7. The information processing device according to claim 2, wherein
in a case where the first user and the second user use a common avatar,
the avatar control unit sets a position of the common avatar in a common space between the peripheral visual field of the first user and the peripheral visual field of the second user.

8. The information processing device according to claim 2, wherein
in a case where the first user and the second user use a common avatar, the avatar control unit selects either the peripheral visual field of the first user or the peripheral visual field of the second user, and sets the position of the common avatar in the selected peripheral visual field.

9. The information processing device according to claim 2, wherein
in a case where the first user is having a dialogue with the second user without looking at the second user,
the specification unit specifies a space between the first user and the second user as the voice dialogue area on a basis of the positional relationship.

10. The information processing device according to claim 9, wherein
in a case where the first user and the second user are moving side by side in parallel,
the avatar control unit sets the position of the avatar at a position outside a space in a moving direction of the first user and the second user.

11. The information processing device according to claim 9, wherein
in a case where the first user is working,
the avatar control unit sets the position of the avatar at a position outside a work area that is an area where the first user performs work.

12. The information processing device according to claim 1, wherein the specification unit specifies in advance an area in which it is estimated that the voice dialogue is possible to be performed between the first user and the second user as the voice dialogue area.

13. The information processing device according to claim 1, wherein the avatar control unit causes a position of the avatar to be presented by displaying an object or outputting a voice.

14. The information processing device according to claim 1, further comprising a recognition unit that performs voice recognition on a basis of the voice information,
wherein the predetermined action is an action determined on a basis of a result of the voice recognition by the recognition unit.

15. The information processing device according to claim 1, wherein the acquisition unit includes a microphone that acquires the voice information of the first user and the second user, and acquires the position information of the second user on a basis of the voice information acquired by the microphone.

16. The information processing device according to claim 1, wherein the acquisition unit includes an imaging device capable of imaging a periphery of the first user, and acquires the position information of the second user on a basis of an image captured by the imaging device.

17. The information processing device according to claim 1, further comprising a communication unit,
wherein the avatar control unit acquires information regarding a position where it is possible to display the avatar for the second user from an external device via communication by the communication unit.

18. The information processing device according to claim 1, further comprising a display unit,
wherein the display unit displays the avatar at the position set by the avatar control unit.

19. An information processing method comprising:
acquiring position information, visual line detection information, and voice information of a first user, and position information of a second user;
determining a positional relationship between the first user and the second user on a basis of the position information of the first user and the position information of the second user; and
specifying a voice dialogue area in which a voice dialogue is possible to be performed between the first user and the second user on a basis of the determined positional relationship; and
setting a position of an avatar outside the specified voice dialogue area,
wherein in a case where the voice information of the first user is acquired when the first user is looking outside the voice dialogue area, the setting causes the avatar to execute a predetermined action, and
in a case where the voice information of the first user is acquired when the first user is looking inside the voice dialogue area, the setting suppresses the avatar from executing the predetermined action.

20. A recording medium recording a program causing a computer to function as:
an acquisition unit that acquires position information, visual line detection information, and voice information of a first user, and position information of a second user;
a determination unit that determines a positional relationship between the first user and the second user on a basis of the position information of the first user and the position information of the second user;
a specification unit that specifies a voice dialogue area in which a voice dialogue is possible to be performed between the first user and the second user on a basis of the determined positional relationship; and
an avatar control unit that sets a position of an avatar outside the specified voice dialogue area,
wherein in a case where the voice information of the first user is acquired when the first user is looking outside the voice dialogue area, the avatar control unit causes the avatar to execute a predetermined action, and
in a case where the voice information of the first user is acquired when the first user is looking inside the voice dialogue area, the avatar control unit suppresses the avatar from executing the predetermined action.

\* \* \* \* \*